US012455574B2

(12) United States Patent
Petrov

(10) Patent No.: US 12,455,574 B2
(45) Date of Patent: Oct. 28, 2025

(54) CONTROL OF AIRCRAFT WITH VERTICAL TAKE-OFF AND LANDING CAPABILITIES

(71) Applicant: PteroDynamics Inc., Moorpark, CA (US)

(72) Inventor: Val Petrov, Brookline, MA (US)

(73) Assignee: PteroDynamics Inc., Moorpark, CA (US)

( * ) Notice: Subject to any disclaimer, the term of this patent is extended or adjusted under 35 U.S.C. 154(b) by 76 days.

(21) Appl. No.: 17/924,789

(22) PCT Filed: May 13, 2021

(86) PCT No.: PCT/US2021/032258
§ 371 (c)(1),
(2) Date: Nov. 11, 2022

(87) PCT Pub. No.: WO2021/242535
PCT Pub. Date: Dec. 2, 2021

(65) Prior Publication Data
US 2023/0195143 A1    Jun. 22, 2023

Related U.S. Application Data

(60) Provisional application No. 63/024,693, filed on May 14, 2020.

(51) Int. Cl.
*G06D 1/00* (2006.01)
*B64C 3/56* (2006.01)
(Continued)

(52) U.S. Cl.
CPC ............... *G05D 1/102* (2013.01); *B64C 3/56* (2013.01); *G01M 1/127* (2013.01); *G05D 1/24* (2024.01); *B64C 29/00* (2013.01); *B64C 29/0033* (2013.01)

(58) Field of Classification Search
CPC .......... G05D 1/102; G05D 1/24; G05D 1/496; G05D 1/621; G05D 2109/24; B64C 3/56;
(Continued)

(56) References Cited

U.S. PATENT DOCUMENTS 1,556,414 A   10/1925   Bumpus
1,793,056 A    2/1931   Carns
(Continued)

FOREIGN PATENT DOCUMENTS

CN   110884652 A    3/2020
RU   2403177 C1    11/2010
(Continued)

OTHER PUBLICATIONS

Setting the PID controller of a drone properly; Apr. 23, 2018; www.technik-consulting.eu; pp. 1-8.*
(Continued)

*Primary Examiner* — Andrew R Dyer
(74) *Attorney, Agent, or Firm* — The Webb Law Firm

(57) ABSTRACT

Provided are computer-implemented methods for autonomously controlling an aircraft with vertical take-off and landing capabilities and folding wings that includes controlling a plurality of thrust producing components of an aircraft to cause the aircraft to rise vertically when wings of the aircraft are in a first folded configuration, where when the wings of the aircraft are in the first folded configuration, a leading edge of each wing is oriented in a vertical direction setting motor controller gains based on the wings of the aircraft being in the first folded configuration, and causing the aircraft to align with a direction of airflow when the wings of the aircraft are in the first folded configuration, and controlling thrust producing components and control surfaces and internal articulation mechanisms of the aircraft to cause the aircraft to transition from folded wing configura-
(Continued)

tion to unfolded wing configuration. Systems and computer program products are also provided.

15 Claims, 10 Drawing Sheets

(51) Int. Cl.
*G01M 1/12* (2006.01)
*G05D 1/00* (2006.01)
*G05D 1/24* (2024.01)
*B64C 29/00* (2006.01)

(58) Field of Classification Search
CPC .... B64C 29/00; B64C 29/0033; G01M 1/127; Y02T 50/10; Y02T 50/50
USPC .......................................................... 701/4
See application file for complete search history.

(56) References Cited

U.S. PATENT DOCUMENTS

| | | | |
|---|---|---|---|
| 1,846,992 A | 2/1932 | Decker | |
| 1,848,389 A | 3/1932 | Sikorsky | |
| 2,572,421 A | 10/1951 | Abel, Jr. | |
| 2,674,422 A | 4/1954 | Pellarini | |
| 3,081,964 A | 3/1963 | Quenzler | |
| 3,179,354 A | 4/1965 | Alvarez-Calderon | |
| 3,231,221 A | 1/1966 | Platt | |
| 3,246,861 A | 4/1966 | Curci | |
| 3,439,890 A | 4/1969 | Stits | |
| 3,519,224 A | 7/1970 | Boyd et al. | |
| 3,666,209 A | 5/1972 | Taylor | |
| 3,937,424 A | 2/1976 | Meier et al. | |
| 4,691,878 A * | 9/1987 | Vaughan | B64C 27/28 |
| | | | 416/142 |
| 4,988,060 A * | 1/1991 | Janson | B64G 1/2224 |
| | | | 244/172.6 |
| 5,094,412 A | 3/1992 | Narramore | |
| 5,192,037 A | 3/1993 | Moorefield | |
| 5,242,132 A * | 9/1993 | Wukowitz | B64C 35/00 |
| | | | 244/105 |
| 5,405,105 A * | 4/1995 | Kress | B64C 29/0033 |
| | | | 244/66 |
| 5,407,150 A | 4/1995 | Sadleir | |
| 5,765,783 A | 6/1998 | Albion | |
| 5,839,691 A | 11/1998 | Lariviere | |
| 6,382,556 B1 | 5/2002 | Pham | |
| 8,157,206 B2 | 4/2012 | Gionta et al. | |
| 8,800,912 B2 | 8/2014 | Oliver | |
| 9,259,984 B2 | 2/2016 | Brown | |
| 9,550,561 B1 * | 1/2017 | Beckman | G05D 3/00 |
| 9,550,567 B1 | 1/2017 | Erdozain, Jr. et al. | |
| 9,676,488 B2 | 6/2017 | Alber | |
| 9,682,774 B2 | 6/2017 | Paduano et al. | |
| 9,714,090 B2 | 7/2017 | Frolov et al. | |
| 9,731,818 B2 | 8/2017 | Dekel et al. | |
| 9,821,909 B2 | 11/2017 | Moshe | |
| 9,964,960 B2 * | 5/2018 | Fegely | G05D 1/0858 |
| 10,556,679 B2 | 2/2020 | Petrov | |
| 11,214,366 B2 * | 1/2022 | Tomic | G01P 13/025 |
| 11,459,117 B1 * | 10/2022 | Shapiro | B64U 70/90 |
| 11,708,157 B2 | 7/2023 | Graves et al. | |
| 2010/0076625 A1 * | 3/2010 | Yoeli | B64C 27/20 |
| | | | 244/175 |
| 2010/0171001 A1 | 7/2010 | Karem | |
| 2011/0024556 A1 * | 2/2011 | Cazals | B64C 23/076 |
| | | | 244/99.12 |
| 2011/0042507 A1 | 2/2011 | Seiford, Sr. | |
| 2012/0261523 A1 | 10/2012 | Shaw | |
| 2013/0008997 A1 | 1/2013 | Gentile | |
| 2013/0112804 A1 * | 5/2013 | Zhu | B64C 29/0025 |
| | | | 244/2 |
| 2013/0206915 A1 * | 8/2013 | Desaulniers | B64U 10/20 |
| | | | 244/165 |
| 2014/0117150 A1 | 5/2014 | Good et al. | |
| 2014/0249700 A1 * | 9/2014 | Elias | B64D 31/00 |
| | | | 701/14 |
| 2015/0225071 A1 | 8/2015 | Tighe | |
| 2015/0266571 A1 | 9/2015 | Bevirt et al. | |
| 2015/0336663 A1 | 11/2015 | Paduano et al. | |
| 2015/0375860 A1 | 12/2015 | Hong et al. | |
| 2016/0023527 A1 | 1/2016 | Dietrich | |
| 2016/0185444 A1 | 6/2016 | Gionta et al. | |
| 2016/0200436 A1 | 7/2016 | North et al. | |
| 2016/0209290 A1 * | 7/2016 | Shue | B64C 29/0033 |
| 2016/0378120 A1 | 12/2016 | Creasman | |
| 2017/0008625 A1 | 1/2017 | Olm et al. | |
| 2017/0072755 A1 | 3/2017 | Zhou et al. | |
| 2017/0097644 A1 | 4/2017 | Fegely et al. | |
| 2017/0190412 A1 | 7/2017 | Bunting et al. | |
| 2017/0217594 A1 | 8/2017 | Bacon et al. | |
| 2017/0217596 A1 | 8/2017 | Bacon et al. | |
| 2017/0217597 A1 | 8/2017 | Bacon et al. | |
| 2017/0217598 A1 | 8/2017 | Bacon et al. | |
| 2017/0225797 A1 * | 8/2017 | Bredenbeck | B64C 27/33 |
| 2017/0233070 A1 | 8/2017 | Starace et al. | |
| 2017/0300066 A1 | 10/2017 | Douglas et al. | |
| 2017/0369163 A1 | 12/2017 | Carlin et al. | |
| 2018/0149545 A1 * | 5/2018 | Parkhurst | G01M 1/125 |
| 2018/0312251 A1 * | 11/2018 | Petrov | B64C 25/34 |
| 2019/0225333 A1 | 7/2019 | Petrov | |
| 2019/0248511 A1 * | 8/2019 | Lewis | H05B 45/00 |
| 2020/0079501 A1 * | 3/2020 | Graves | B64C 27/30 |
| 2020/0156780 A1 * | 5/2020 | Varigas | B64C 39/068 |
| 2020/0377207 A1 * | 12/2020 | Suzuki | B64D 9/00 |
| 2021/0053670 A1 * | 2/2021 | Landry | B64U 30/40 |
| 2021/0362848 A1 * | 11/2021 | Spencer | B64C 29/0033 |

FOREIGN PATENT DOCUMENTS

| | | |
|---|---|---|
| WO | 2014177589 A1 | 11/2014 |
| WO | 2017184270 A2 | 10/2017 |

OTHER PUBLICATIONS

Michelhaugh, T. M., et al., "Wing-folding mechanism of the Grumman Wildcat," Amer. Soc. Mech. Eng. Brochure, <https://www.asme.org/getmedia/2d64abc8-3fa3-4d29-92d4-40db4777e8b2/238-grumman-wildcat-sto-wing-wing-folding-mechanism.aspx.>, May 15, 2006.

* cited by examiner

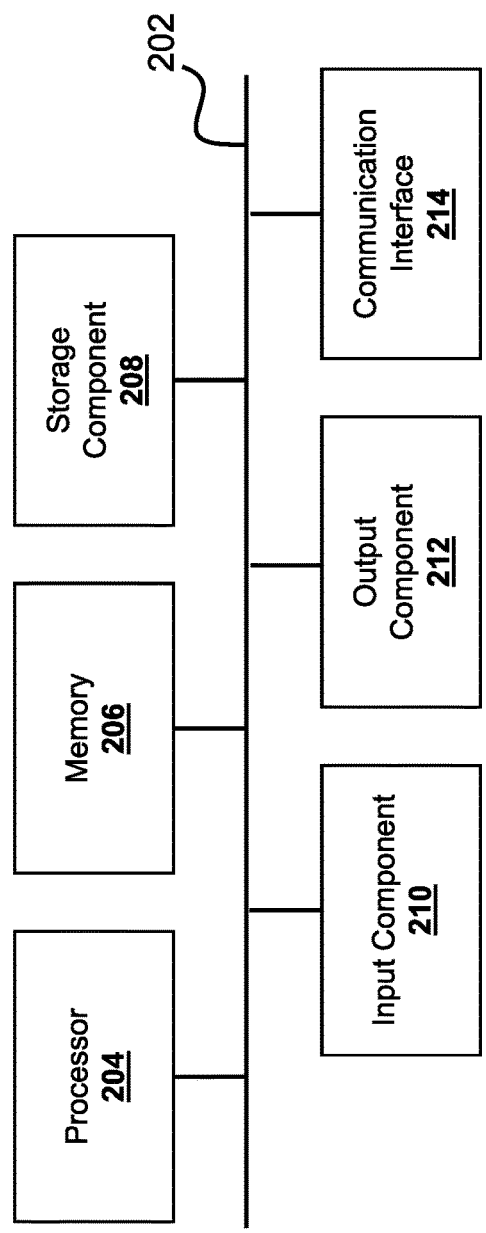

CONTROL OF AIRCRAFT WITH VERTICAL TAKE-OFF AND LANDING CAPABILITIES

CROSS REFERENCE TO RELATED APPLICATIONS

This application is the United States national phase of International Application No. PCT/US2021/032258, filed May 13, 2021, and claims priority to U.S. Provisional Patent Application No. 63/024,693, filed May 14, 2020, the disclosures of which are hereby incorporated by reference in their entirety.

BACKGROUND

Field

This disclosure relates generally to aircraft and, in some non-limiting embodiments or aspects, to systems, methods, and computer program products for controlling an aircraft that is capable of vertical take-off and landing.

Technical Considerations

A vertical take-off and landing (VTOL) aircraft is one that can hover, take off, and land vertically. For example, a VTOL aircraft may include a variety of types of aircraft, including fixed-wing aircraft as well as helicopters and other aircraft with powered rotors, such as cyclocopters (e.g., cyclogyros) and tiltrotors. In some instances, the VTOL aircraft can operate in modes other than VTOL, such as conventional take-off and landing (CTOL), short take-off and landing (STOL), and/or short take-off and vertical landing (STOVL). Other VTOL aircraft, such as some helicopters, can only operate in a VTOL mode. This may be due to the VTOL aircraft lacking landing gear that can handle horizontal motion.

However, certain designs of VTOL aircraft may suffer from low stability and may involve problems for a pilot of a VTOL aircraft based on the design. For example, a pilot of the VTOL aircraft may have to operate numerous control devices with precise control in a short period of time, depending on the stage of flight of the VTOL aircraft. In such an example, keeping the VTOL aircraft within a correct orientation as the VTOL aircraft is taking off may be particularly complex for a pilot. In such a scenario, a delay in pilot response may lead to compounding of errors, and potentially a crash of the VTOL aircraft.

SUMMARY

Disclosed are systems, methods, and computer program products for controlling an aircraft that is capable of vertical take-off and landing that may augment pilot inputs or used for autonomous aircraft navigation.

Further embodiments are set forth in the following numbered clauses:

Clause 1: A computer-implemented method of autonomously controlling a transition of an aircraft between a hovering configuration and a forward flight configuration comprising: controlling, by at least one processor, a plurality of thrust producing components of an aircraft to cause the aircraft to rise vertically when wings of the aircraft are in a first folded configuration, wherein when the wings of the aircraft are in the first folded configuration a leading edge of each wing is oriented in a vertical direction; setting, by at least one processor, motor controller gains based on the wings of the aircraft being in the first folded configuration; and causing, by the at least one processor, the aircraft to align with a direction of airflow when the wings of the aircraft are in the first folded configuration.

Clause 2: The computer-implemented method of clause 1 wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

Clause 3: The computer-implemented method of clauses 1 or 2, further comprising: determining that the aircraft is aligned with the direction of airflow when the wings of the aircraft are in the first folded configuration and the aircraft is in flight.

Clause 4: The computer-implemented method of any of clauses 1-3, further comprising: determining a center of gravity of the aircraft before providing power to the plurality of thrust producing components of the aircraft to cause the aircraft to rise vertically.

Clause 5: The computer-implemented method of any of clauses 1-4, further comprising: determining that the aircraft has reached a target altitude; determining that an orientation of the aircraft corresponds to a predetermined orientation; and changing a fold angle of the wings of the aircraft from the first folded configuration based on an airspeed of the aircraft.

Clause 6: The computer-implemented method of any of clauses 1-5, further comprising: determining whether an orientation of the aircraft corresponds to a predetermined orientation; and adjusting a flight control surface of the aircraft based on determining that the orientation of the aircraft does not correspond to the predetermined orientation.

Clause 7: The computer-implemented method of any of clauses 1-6, further comprising: determining whether an orientation of the aircraft corresponds to a predetermined orientation; and providing power to one thrust producing component of the plurality of thrust producing components of the aircraft to cause the orientation of the aircraft to change based on determining that the orientation of the aircraft does not correspond to the predetermined orientation.

Clause 8: A system for autonomously controlling a transition of an aircraft between a hovering configuration and a forward flight configuration comprising: at least one processor programmed or configured to: control a plurality of thrust producing components of an aircraft to cause the aircraft to rise vertically when wings of the aircraft are in a first folded configuration, wherein when the wings of the aircraft are in the first folded configuration a leading edge of each wing is oriented in a vertical direction; set motor controller gains based on the wings of the aircraft being in the first folded configuration; and cause the aircraft to align with a direction of airflow when the wings of the aircraft are in the first folded configuration.

Clause 9: The system of clause 8, wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

Clause 10: The system of clauses 8 or 9, wherein the at least one processor is further programmed or configured to: determine that the aircraft is aligned with the direction of airflow when the wings of the aircraft are in the first folded configuration and the aircraft is in flight.

Clause 11: The system of any of clauses 8-10, wherein the at least one processor is further programmed or configured to: determine a center of gravity of the aircraft before providing power to the plurality of thrust producing components of the aircraft to cause the aircraft to rise vertically.

Clause 12: The system of any of clauses 8-11, wherein the at least one processor is further programmed or configured to: determine that the aircraft has reached a target altitude; determine that an orientation of the aircraft corresponds to a predetermined orientation; and change a fold angle of the wings of the aircraft from the first folded configuration based on an airspeed of the aircraft.

Clause 13: The system of any of clauses 8-12, wherein the at least one processor is further programmed or configured to: determine whether an orientation of the aircraft corresponds to a predetermined orientation; and adjust a flight control surface of the aircraft based on determining that the orientation of the aircraft does not correspond to the predetermined orientation.

Clause 14: The system of any of clauses 8-13, wherein the at least one processor is further programmed or configured to: determine whether an orientation of the aircraft corresponds to a predetermined orientation; and provide power to one thrust producing component of the plurality of thrust producing components of the aircraft to cause the orientation of the aircraft to change based on determining that the orientation of the aircraft does not correspond to the predetermined orientation.

Clause 15: A computer program product for autonomously controlling a transition of an aircraft between a hovering configuration and a forward flight configuration, including one or more instructions that, when executed by at least one processor, cause the at least one processor to: control a plurality of thrust producing components of an aircraft to cause the aircraft to rise vertically when wings of the aircraft are in a first folded configuration, wherein when the wings of the aircraft are in the first folded configuration a leading edge of each wing is oriented in a vertical direction; set motor controller gains based on the wings of the aircraft being in the first folded configuration; and cause the aircraft to align with a direction of airflow when the wings of the aircraft are in the first folded configuration.

Clause 16: The computer program product of clause 15, wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

Clause 17: The computer program product of clauses 15 or 16, wherein the one or more instructions further cause the at least one processor to: determine that the aircraft is aligned with the direction of airflow when the wings of the aircraft are in the first folded configuration and the aircraft is in flight.

Clause 18: The computer program product of any of clauses 15-17, wherein the one or more instructions further cause the at least one processor to: determine a center of gravity of the aircraft before providing power to the plurality of thrust producing components of the aircraft to cause the aircraft to rise vertically.

Clause 19: The computer program product of any of clauses 15-18, wherein the one or more instructions further cause the at least one processor to: determine that the aircraft has reached a target altitude; determine that an orientation of the aircraft corresponds to a predetermined orientation; and change a fold angle of the wings of the aircraft from the first folded configuration based on an airspeed of the aircraft.

Clause 20: The computer program product of any of clauses 15-19, wherein the one or more instructions further cause the at least one processor to: determine whether an orientation of the aircraft corresponds to a predetermined orientation; and adjust a flight control surface of the aircraft based on determining that the orientation of the aircraft does not correspond to the predetermined orientation.

Clause 21: The computer program product of any of clauses 15-20, wherein the one or more instructions further cause the at least one processor to: determine whether an orientation of the aircraft corresponds to a predetermined orientation; and provide power to one thrust producing component of the plurality of thrust producing components of the aircraft to cause the orientation of the aircraft to change based on determining that the orientation of the aircraft does not correspond to the predetermined orientation.

Clause 22: A computer-implemented method of autonomously controlling transition of an aircraft between a hovering configuration and a forward flight configuration comprising: determining, by at least one processor, that an aircraft has reached a target altitude; changing, by at least one processor, a fold angle of wings of the aircraft from a first folded configuration, wherein when the wings of the aircraft are in the first folded configuration a leading edge of each wing is oriented in a vertical direction; and determining, by at least one processor, whether the fold angle of the wings of the aircraft correspond to a predetermined fold angle.

Clause 23: The computer-implemented method of clause 22, further comprising: adjusting a flight control surface of the aircraft based on determining that the fold angle of the wings of the aircraft correspond to the predetermined fold angle.

Clause 24: The computer-implemented method of clauses 22 or 23, wherein changing the fold angle of the wings of the aircraft from the first folded configuration comprises: changing the fold angle of wings of the aircraft from the first folded configuration to a first fold angle based on an airspeed of the aircraft.

Clause 25: The computer-implemented method of any of clauses 22-24, further comprising: setting motor controller gains based on the first fold angle of the wings of the aircraft.

Clause 26: The computer-implemented method of any of clauses 22-25, wherein determining whether the fold angle of the wings of the aircraft correspond to the predetermined fold angle comprises: determining whether the fold angle of the wings of the aircraft correspond to a second folded configuration, wherein the second folded configuration comprises the wings having a fold angle that is halfway between the first folded configuration and an unfolded configuration.

Clause 27: The computer-implemented method of any of clauses 22-26, wherein changing the fold angle of wings of the aircraft from the first folded configuration comprises: changing the fold angle of wings of the aircraft from the first folded configuration at a first transition speed based on an airspeed of the aircraft.

Clause 28: The computer-implemented method of any of clauses 22-27, further comprising: determining whether an orientation of the aircraft corresponds to a predetermined orientation after determining that the aircraft has reached the target altitude; and adjusting a flight control surface of the aircraft based on determining that the orientation of the aircraft does not correspond to the predetermined orientation.

Clause 29: The computer-implemented method of any of clauses 22-28, wherein changing the fold angle of the wings of the aircraft from the first folded configuration comprises: changing the fold angle of wings of the aircraft from the first folded configuration to a first fold angle based on a first airspeed of the aircraft; and changing the fold angle of wings of the aircraft from the first fold angle to an unfolded configuration based on a second airspeed of the aircraft.

Clause 30: The computer-implemented method of any of clauses 22-29, wherein determining whether the fold angle of the wings of the aircraft correspond to the predetermined fold angle comprises: determining whether the fold angle of the wings of the aircraft correspond to a fold angle associated with an unfolded configuration of the wings of the aircraft.

Clause 31: The computer-implemented method of any of clauses 22-30, wherein changing the fold angle of wings of the aircraft from the first fold angle to an unfolded configuration based on the second airspeed of the aircraft comprises: changing the fold angle of wings of the aircraft from the first fold angle to an unfolded configuration at a maximum transition speed based on the second airspeed of the aircraft, wherein the second airspeed of the aircraft is an airspeed that is equal to a stall speed of the aircraft.

Clause 32: The computer-implemented method of any of clauses 22-31, further comprising: adjusting a flight control surface of the aircraft based on determining that an orientation of the aircraft does not correspond to a predetermined orientation at the same time when changing the fold angle of wings of the aircraft from the first fold angle to an unfolded configuration.

Clause 33: The computer-implemented method of any of clauses 22-32, wherein changing the fold angle of the wings of the aircraft from the first folded configuration comprises: changing the fold angle of wings of the aircraft from the first folded configuration to an unfolded configuration based on an airspeed of the aircraft; wherein determining whether the fold angle of the wings of the aircraft correspond to the predetermined fold angle comprises: determining whether the fold angle of the wings of the aircraft correspond to a fold angle associated with the unfolded configuration of the wings of the aircraft; and the method further comprising: determining a flight path of the aircraft; and controlling a plurality of thrust producing components of the aircraft to cause the aircraft to fly according to the flight path based on determining that the fold angle of the wings of the aircraft correspond to the fold angle associated with the unfolded configuration of the wings of the aircraft.

Clause 34: A system for autonomously controlling transition of an aircraft between a hovering configuration and a forward flight configuration comprising: at least one processor programmed or configured to: determine that an aircraft has reached a target altitude; change a fold angle of wings of the aircraft from a first folded configuration, wherein when the wings of the aircraft are in the first folded configuration a leading edge of each wing is oriented in a vertical direction; and determine whether the fold angle of the wings of the aircraft correspond to a predetermined fold angle.

Clause 35: The system of clause 34, wherein the at least one processor is further programmed or configured to: adjust a flight control surface of the aircraft based on determining that the fold angle of the wings of the aircraft correspond to the predetermined fold angle.

Clause 36: The system of clause 34 or 35, wherein, when changing the fold angle of the wings of the aircraft from the first folded configuration, the at least one processor is programmed or configured to: change the fold angle of wings of the aircraft from the first folded configuration to a first fold angle based on an airspeed of the aircraft.

Clause 37: The system of any of clauses 34-36, wherein the at least one processor is further programmed or configured to: set motor controller gains based on the first fold angle of the wings of the aircraft.

Clause 38: The system of any of clauses 34-37, wherein, when determining whether the fold angle of the wings of the aircraft correspond to the predetermined fold angle, the at least one processor is programmed or configured to: determine whether the fold angle of the wings of the aircraft correspond to a second folded configuration, wherein the second folded configuration comprises the wings having a fold angle that is halfway between the first folded configuration and an unfolded configuration.

Clause 39: The system of any of clauses 34-38, wherein, when changing the fold angle of wings of the aircraft from the first folded configuration, the at least one processor is programmed or configured to: change the fold angle of wings of the aircraft from the first folded configuration at a first transition speed based on an airspeed of the aircraft.

Clause 40: The system of any of clauses 34-39, wherein the at least one processor is further programmed or configured to: determine whether an orientation of the aircraft corresponds to a predetermined orientation after determining that the aircraft has reached the target altitude; and adjust a flight control surface of the aircraft based on determining that the orientation of the aircraft does not correspond to the predetermined orientation.

Clause 41: The system of any of clauses 34-40, wherein, when changing the fold angle of the wings of the aircraft from the first folded configuration, the at least one processor is programmed or configured to: change the fold angle of wings of the aircraft from the first folded configuration to a first fold angle based on a first airspeed of the aircraft; and change the fold angle of wings of the aircraft from the first fold angle to an unfolded configuration based on a second airspeed of the aircraft.

Clause 42: The system of any of clauses 34-41, wherein, when determining whether the fold angle of the wings of the aircraft correspond to the predetermined fold angle, the at least one processor is further programmed or configured to: determine whether the fold angle of the wings of the aircraft correspond to a fold angle associated with an unfolded configuration of the wings of the aircraft.

Clause 43: The system of any of clauses 34-42, wherein, when changing the fold angle of wings of the aircraft from the first fold angle to an unfolded configuration based on the second airspeed of the aircraft, the at least one processor is further programmed or configured to: change the fold angle of wings of the aircraft from the first fold angle to an unfolded configuration at a maximum transition speed based on the second airspeed of the aircraft, wherein the second airspeed of the aircraft is an airspeed that is equal to a stall speed of the aircraft.

Clause 44: The system of any of clauses 34-43, wherein the at least one processor is further programmed or configured to: adjust a flight control surface of the aircraft based on determining that an orientation of the aircraft does not correspond to a predetermined orientation at the same time when changing the fold angle of wings of the aircraft from the first fold angle to an unfolded configuration.

Clause 45: The system of any of clauses 34-44, wherein, when changing the fold angle of the wings of the aircraft from the first folded configuration, the at least one processor is programmed or configured to: change the fold angle of wings of the aircraft from the first folded configuration to an unfolded configuration based on an airspeed of the aircraft; wherein, when determining whether the fold angle of the wings of the aircraft correspond to the predetermined fold angle, the at least one processor is programmed or configured to: determine whether the fold angle of the wings of the aircraft correspond to a fold angle associated with the unfolded configuration of the wings of the aircraft; and wherein the at least one processor is further programmed or configured to: determine a flight path of the aircraft; and control a plurality of thrust producing components of the aircraft to cause the aircraft to fly according to the flight path based on determining that the fold angle of the wings of the aircraft correspond to the fold angle associated with the unfolded configuration of the wings of the aircraft.

Clause 46: A computer program product for autonomously controlling transition of an aircraft between a hovering configuration and a forward flight configuration, including one or more instructions that, when executed by at least one processor, cause the at least one processor to: determine that an aircraft has reached a target altitude; change a fold angle of wings of the aircraft from a first folded configuration, wherein when the wings of the aircraft are in the first folded configuration a leading edge of each wing is oriented in a vertical direction; and determine whether the fold angle of the wings of the aircraft correspond to a predetermined fold angle.

Clause 47: The computer program product of clause 46, wherein the one or more instructions further cause the at least one processor to: adjust a flight control surface of the aircraft based on determining that the fold angle of the wings of the aircraft correspond to the predetermined fold angle.

Clause 48: The computer program product of clause 46 or 47, wherein, the one or more instructions that cause the at least one processor to change the fold angle of the wings of the aircraft from the first folded configuration, cause the at least one processor to: change the fold angle of wings of the aircraft from the first folded configuration to a first fold angle based on an airspeed of the aircraft.

Clause 49: The computer program product of any of clauses 46-48, wherein the one or more instructions further cause the at least one processor to: set motor controller gains based on the first fold angle of the wings of the aircraft.

Clause 50: The computer program product of any of clauses 46-49, wherein, the one or more instructions that cause the at least one processor to determine whether the fold angle of the wings of the aircraft correspond to the predetermined fold angle, cause the at least one processor to: determine whether the fold angle of the wings of the aircraft correspond to a second folded configuration, wherein the second folded configuration comprises the wings having a fold angle that is halfway between the first folded configuration and an unfolded configuration.

Clause 51: The computer program product of any of clauses 46-50, wherein, the one or more instructions that cause the at least one processor to change the fold angle of wings of the aircraft from the first folded configuration, cause the at least one processor to: change the fold angle of wings of the aircraft from the first folded configuration at a first transition speed based on an airspeed of the aircraft.

Clause 52: The computer program product of any of clauses 46-51, wherein the one or more instructions further cause the at least one processor to: determine whether an orientation of the aircraft corresponds to a predetermined orientation after determining that the aircraft has reached the target altitude; and adjust a flight control surface of the aircraft based on determining that the orientation of the aircraft does not correspond to the predetermined orientation.

Clause 53: The computer program product of any of clauses 46-52, wherein, the one or more instructions that cause the at least one processor to change the fold angle of the wings of the aircraft from the first folded configuration, cause the at least one processor to: change the fold angle of wings of the aircraft from the first folded configuration to a first fold angle based on a first airspeed of the aircraft; and change the fold angle of wings of the aircraft from the first fold angle to an unfolded configuration based on a second airspeed of the aircraft.

Clause 54: The computer program product of any of clauses 46-53, wherein, the one or more instructions that cause the at least one processor to determine whether the fold angle of the wings of the aircraft correspond to the predetermined fold angle, cause the at least one processor to: determine whether the fold angle of the wings of the aircraft correspond to a fold angle associated with an unfolded configuration of the wings of the aircraft.

Clause 55: The computer program product of any of clauses 46-54, wherein, the one or more instructions that cause the at least one processor to change the fold angle of wings of the aircraft from the first fold angle to an unfolded configuration based on the second airspeed of the aircraft, cause the at least one processor to: change the fold angle of wings of the aircraft from the first fold angle to an unfolded configuration at a maximum transition speed based on the second airspeed of the aircraft, wherein the second airspeed of the aircraft is an airspeed that is equal to a stall speed of the aircraft.

Clause 56: The computer program product of any of clauses 46-55, wherein the one or more instructions further cause the at least one processor to: adjust a flight control surface of the aircraft based on determining that an orientation of the aircraft does not correspond to a predetermined orientation at the same time when changing the fold angle of wings of the aircraft from the first fold angle to an unfolded configuration.

Clause 57: The computer program product of any of clauses 46-56, wherein, the one or more instructions that cause the at least one processor to change the fold angle of the wings of the aircraft from the first folded configuration, cause the at least one processor to: change the fold angle of wings of the aircraft from the first folded configuration to an unfolded configuration based on an airspeed of the aircraft; wherein, the one or more instructions that cause the at least one processor to determine whether the fold angle of the wings of the aircraft correspond to the predetermined fold angle, cause the at least one processor to: determine whether the fold angle of the wings of the aircraft correspond to a fold angle associated with the unfolded configuration of the wings of the aircraft; and wherein the one or more instructions further cause the at least one processor to: determine a flight path of the aircraft; and control a plurality of thrust producing components of the aircraft to cause the aircraft to fly according to the flight path based on determining that the fold angle of the wings of the aircraft correspond to the fold angle associated with the unfolded configuration of the wings of the aircraft.

Clause 58: A computer-implemented method of autonomously controlling a transition of an aircraft between a forward flight configuration and a hovering configuration comprising: controlling, by at least one processor, an aircraft to cause the aircraft to reduce airspeed of the aircraft when wings of the aircraft are in an unfolded configuration, wherein when the wings of the aircraft are in the unfolded configuration a leading edge of each wing is oriented in a horizontal direction; determining, by at least one processor, the airspeed of the aircraft; and changing, by at least one processor, a fold angle of wings of the aircraft from the unfolded configuration to a first folded configuration based on the airspeed of the aircraft, wherein when the wings of the aircraft are in the first folded configuration the leading edge of each wing is oriented in a vertical direction.

Clause 59: The computer-implemented method of clause 58, wherein changing the fold angle of the wings of the aircraft from the unfolded configuration to the first folded configuration comprises: changing the fold angle of the wings of the aircraft from the unfolded configuration to the first folded configuration at a transition speed that is based on the airspeed of the aircraft.

Clause 60: The computer-implemented method of clause 58 or 59, wherein changing the fold angle of the wings of the aircraft at the transition speed comprises: changing the fold angle of the wings of the aircraft from the unfolded configuration to the first folded configuration at the transition speed according to a function that is based on the airspeed of the aircraft.

Clause 61: The computer-implemented method of any of clauses 58-60, further comprising: comparing the airspeed of the aircraft to a threshold value; determining whether the airspeed of the aircraft is greater than the threshold value; and controlling the aircraft to decelerate the aircraft based on determining that the airspeed of the aircraft is greater than the threshold value.

Clause 62: The computer-implemented method of any of clauses 58-61, further comprising: comparing the airspeed of the aircraft to a threshold value; determining whether the airspeed of the aircraft is less than the threshold value; and controlling the aircraft to accelerate the aircraft based on determining that the airspeed of the aircraft is less than the threshold value.

Clause 63: The computer-implemented method of any of clauses 58-62, wherein changing the fold angle of wings of the aircraft from the unfolded configuration to the first folded configuration comprises: changing the fold angle of wings of the aircraft from the unfolded configuration to the first folded configuration based on determining that the airspeed of the aircraft satisfies a threshold value.

Clause 64: The computer-implemented method of any of clauses 58-63, wherein controlling the aircraft to cause the aircraft to reduce airspeed of the aircraft when the wings of the aircraft are in the unfolded configuration comprises: controlling a plurality of thrust producing components of the aircraft or a flight control surface of the aircraft to cause the aircraft to reduce the airspeed of the aircraft when the wings of the aircraft are in the unfolded configuration.

Clause 65: A system for autonomously controlling a transition of an aircraft between a forward flight configuration and a hovering configuration comprising: at least one processor programmed or configured to: control an aircraft to cause the aircraft to reduce airspeed of the aircraft when wings of the aircraft are in an unfolded configuration, wherein when the wings of the aircraft are in the unfolded configuration a leading edge of each wing is oriented in a horizontal direction; determine the airspeed of the aircraft; and change a fold angle of wings of the aircraft from the unfolded configuration to a first folded configuration based on the airspeed of the aircraft, wherein when the wings of the aircraft are in the first folded configuration the leading edge of each wing is oriented in a vertical direction.

Clause 66: The system of clause 65, wherein, when changing the fold angle of the wings of the aircraft from the unfolded configuration to the first folded configuration, the at least one processor is programmed or configured to: change the fold angle of the wings of the aircraft from the unfolded configuration to the first folded configuration at a transition speed that is based on the airspeed of the aircraft.

Clause 67: The system of clause 65 or 66, wherein, when changing the fold angle of the wings of the aircraft at the transition speed, the at least one processor is programmed or configured to: change the fold angle of the wings of the aircraft from the unfolded configuration to the first folded configuration at the transition speed according to a function that is based on the airspeed of the aircraft.

Clause 68: The system of any of clauses 65-67, wherein the at least one processor is further programmed or configured to: compare the airspeed of the aircraft to a threshold value; determine whether the airspeed of the aircraft is greater than the threshold value; and control the aircraft to decelerate the aircraft based on determining that the airspeed of the aircraft is greater than the threshold value.

Clause 69: The system of any of clauses 65-68, wherein the at least one processor is further programmed or configured to: compare the airspeed of the aircraft to a threshold value; determine whether the airspeed of the aircraft is less than the threshold value; and control the aircraft to accelerate the aircraft based on determining that the airspeed of the aircraft is less than the threshold value.

Clause 70: The system of any of clauses 65-69, wherein, when changing the fold angle of wings of the aircraft from the unfolded configuration to the first folded configuration, the at least one processor is programmed or configured to: change the fold angle of wings of the aircraft from the unfolded configuration to the first folded configuration based on determining that the airspeed of the aircraft satisfies a threshold value.

Clause 71: The system of any of clauses 65-70, wherein, when controlling the aircraft to cause the aircraft to reduce airspeed of the aircraft when the wings of the aircraft are in the unfolded configuration, the at least one processor is programmed or configured to: control a plurality of thrust producing components of the aircraft or a flight control surface of the aircraft to cause the aircraft to reduce the airspeed of the aircraft when the wings of the aircraft are in the unfolded configuration.

Clause 72: A computer program product for autonomously controlling a transition of an aircraft between a forward flight configuration and a hovering configuration, including one or more instructions that, when executed by at least one processor, cause the at least one processor to: control an aircraft to cause the aircraft to reduce airspeed of the aircraft when wings of the aircraft are in an unfolded configuration, wherein when the wings of the aircraft are in the unfolded configuration a leading edge of each wing is oriented in a horizontal direction; determine the airspeed of the aircraft; and change a fold angle of wings of the aircraft from the unfolded configuration to a first folded configuration based on the airspeed of the aircraft, wherein when the wings of the aircraft are in the first folded configuration the leading edge of each wing is oriented in a vertical direction.

Clause 73: The computer program product of clause 72, wherein, the one or more instructions that cause the at least one processor to change the fold angle of the wings of the aircraft from the unfolded configuration to the first folded configuration, cause the at least one processor to: change the fold angle of the wings of the aircraft from the unfolded configuration to the first folded configuration at a transition speed that is based on the airspeed of the aircraft.

Clause 74: The computer program product of clauses 72 or 73, wherein, the one or more instructions that cause the at least one processor to change the fold angle of the wings of the aircraft at the transition speed, cause the at least one processor to: change the fold angle of the wings of the aircraft from the unfolded configuration to the first folded configuration at the transition speed according to a function that is based on the airspeed of the aircraft.

Clause 75: The computer program product of any of clauses 72-74, wherein the one or more instructions further cause the at least one processor to: compare the airspeed of the aircraft to a threshold value; determine whether the airspeed of the aircraft is greater than the threshold value; and control the aircraft to decelerate the aircraft based on determining that the airspeed of the aircraft is greater than the threshold value.

Clause 76: The computer program product of any of clauses 72-75, wherein the one or more instructions further cause the at least one processor to: compare the airspeed of the aircraft to a threshold value; determine whether the airspeed of the aircraft is less than the threshold value; and control the aircraft to accelerate the aircraft based on determining that the airspeed of the aircraft is less than the threshold value.

Clause 77: The computer program product of any of clauses 72-76, wherein, the one or more instructions that cause the at least one processor to change the fold angle of wings of the aircraft from the unfolded configuration to the first folded configuration, cause the at least one processor to: change the fold angle of wings of the aircraft from the unfolded configuration to the first folded configuration based on determining that the airspeed of the aircraft satisfies a threshold value.

Clause 78: The computer program product of any of clauses 72-77, wherein, the one or more instructions that cause the at least one processor to control the aircraft to cause the aircraft to reduce airspeed of the aircraft when the wings of the aircraft are in the unfolded configuration, cause the at least one processor to: control a plurality of thrust producing components of the aircraft or a flight control surface of the aircraft to cause the aircraft to reduce the airspeed of the aircraft when the wings of the aircraft are in the unfolded configuration.

Features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 2 is a diagram of a non-limiting aspect or embodiment of components of one or more devices and/or one or more systems of FIGS. 1A and 1B;

DESCRIPTION

Figure 1A:
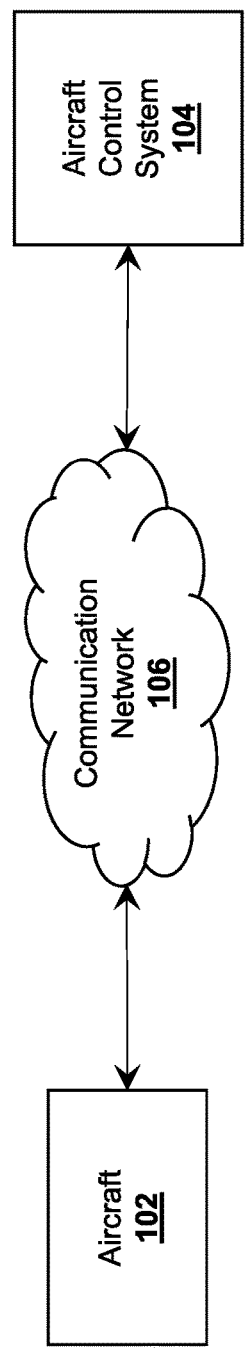
FIG. 1A is a diagram of a non-limiting embodiment of a system for controlling an aircraft capable of vertical take-off and landing.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a processor, a computing device, etc.) as appropriately referred to herein.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Referring now to FIG. 1A, FIG. 1A is a diagram of an example environment 100 in which devices, systems, methods, and/or products described herein may be implemented. As shown in FIG. 1A, environment 100 includes aircraft 102, aircraft control system 104, and communication network 106. Aircraft 102, aircraft control system 104, and/or communication network 106 may interconnect (e.g., establish a connection to communicate, and/or the like) via wired connections, wireless connections, or a combination of wired and wireless connections.

Aircraft 102 may include one or more aircraft configured to be controlled (e.g., autonomously controlled, semi-autonomously controlled, etc.) for vertical take-off and landing operations and for flight to or from a destination along a flight path. For example, aircraft 102 may include an aircraft having an airframe as disclosed in U.S. Patent Application Publication No. 2018/0312251, which is incorporated by reference herein in its entirety.

Aircraft 102, as described herein, may perform repeated in-flight transformations between a compact and maneuverable hovering configuration (e.g., when the wings of aircraft 102 are in a first folded configuration) and a forward flight configuration (e.g., a cruising configuration, a cruising state, etc.) capable of efficient horizontal flight (e.g., when the wings of aircraft 102 are in an unfolded configuration). In the hovering or slow speed configuration, the weight of aircraft 102 may be substantially supported by the thrust of thrust producing components of aircraft 102, which may be coupled to the wings such that the thrust producing components are also tilted to direct their thrust more vertically. In the forward flight configuration, the weight of aircraft 102 may be substantially supported by the lift generated from the wings and the propulsion thrust may be directed horizontally. Additionally or alternatively, a continuous range of intermediate configurations of the wings (e.g., based on the titled position of the wings) may also be employed to provide varying levels of thrust and/or wing-developed lifting force. Aircraft 102, as disclosed herein, may provide a unique ability to smoothly and stably change (e.g., transition) between configurations of the wings during flight of aircraft 102 and/or to operate indefinitely when the wings are in a specific configuration, such as an intermediate configuration.

In some non-limiting embodiments, the performance characteristics of aircraft 102 may be achieved by utilizing a folding wing structure, such as the structure of wings and wing articulation system 110 described below, that uses a folding motion by which a wing or a portion of a wing pivots on a slanted axis. The slanted axis may be an axis that is oblique to a longitudinal axis or lateral axis of aircraft 102. Such a folding motion can orient a leading edge of each wing in an upward or forward direction, depending on the fold angle of the wing. In some non-limiting embodiments, in a folded configuration, the wings can extend along the fuselage of aircraft 102 to reduce the moment of inertia created by the mass of the wings, the aerodynamic impact of the wings when aircraft 102 is in a hovering configuration, as well as an amount of space required for storage and/or ground transport of aircraft 102. In some non-limiting embodiments, a portion of the wings folded in this manner may include thrust producing components coupled to the wings, such that thrust can be redirected between a horizontal and a vertical direction as a fold of the wings is changed (e.g., as the wings are tilted or folded).

Aircraft control system 104 may include one or more devices configured to be in communication (e.g., transmit and/or receive information) with aircraft 102 and/or to provide control signals (e.g., commands, command signals, etc.) to aircraft 102 via communication network 106. For example, aircraft control system 104 may include a computer device, such as a server, and/or the like. Aircraft control system 104 may be configured to transmit and/or receive data to and/or from communication network 106 via an imaging system and/or a short-range wireless communication connection (e.g., a near-field communication (NFC) connection, a radio frequency identification (RFID) communication connection, a Bluetooth® communication connection, and/or the like). In some non-limiting embodiments or aspects, aircraft control system 104 may be associated with a user, as described herein.

Communication network 106 may include one or more wired and/or wireless networks. For example, communication network 106 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1A are provided as an example. There may be additional systems and/or devices, fewer systems and/or devices, different systems and/or devices, or differently arranged systems and/or devices than those shown in FIG. 1A. Furthermore, two or more systems and/or devices shown in FIG. 1A may be implemented within a single system or a single device, or a single system or a single device shown in FIG. 1A may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 1B:
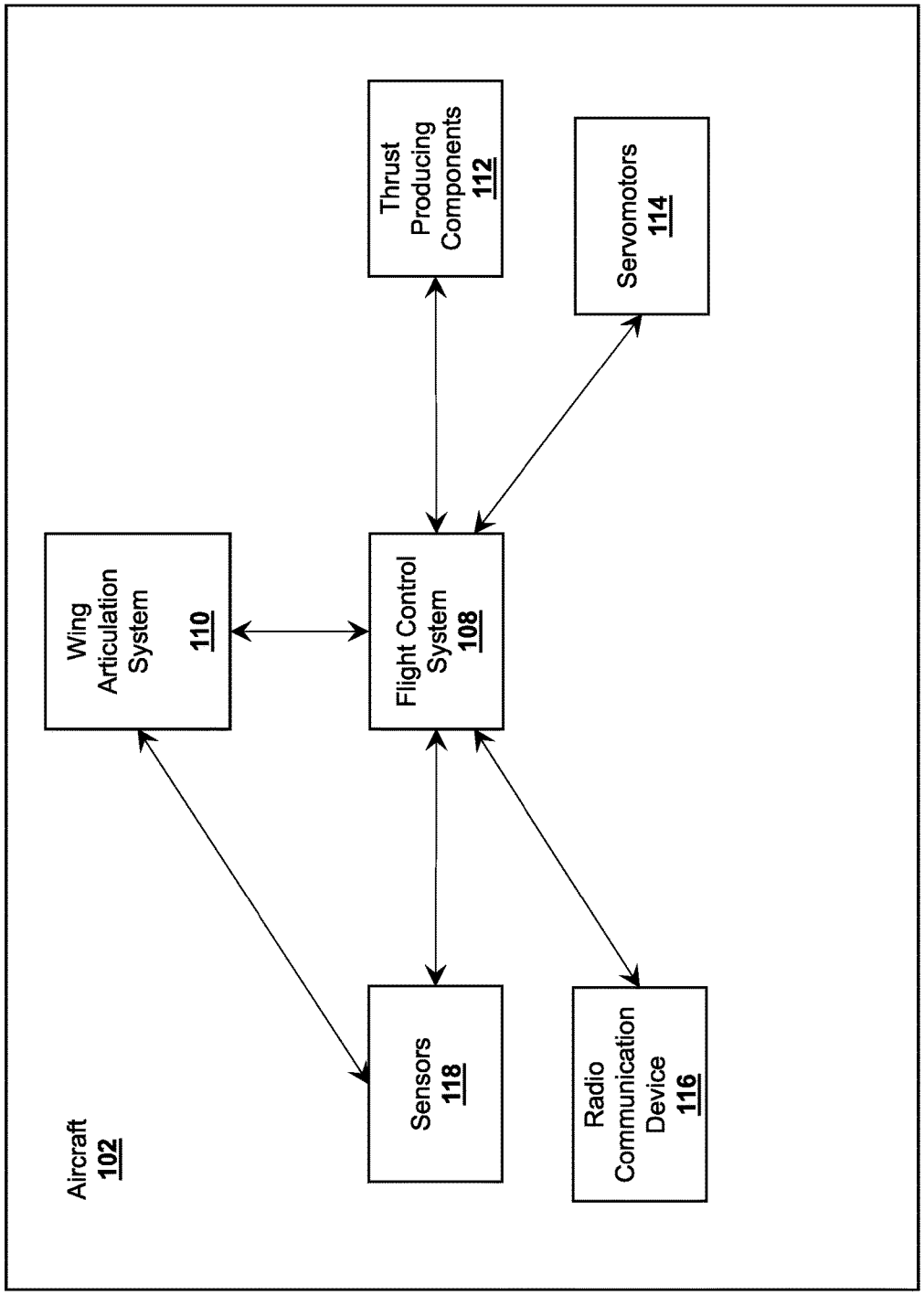
FIG. 1B is a diagram of a non-limiting embodiment of an aircraft capable of vertical take-off and landing.

Referring now to FIG. 1B, FIG. 1B is a diagram of a non-limiting embodiment of aircraft 102. As shown in FIG. 1B, aircraft 102 includes flight control system 108, wing articulation system 110, thrust producing components 112, servomotors 114, radio communication device 116, and sensors 118. The components of aircraft 102 may interconnect (e.g., establish a connection to communicate, and/or the like) via wired connections, wireless connections, or a combination of wired and wireless connections.

Flight control system 108 may include one or more devices configured to control operations of aircraft 102. For example, flight control system 108 may include one or more computer devices, such as one or more processors, controllers, microcontrollers, and/or the like. In some non-limiting embodiments, flight control system 108 may receive an input from another component, such as a sensor of sensors 118, and flight control system 108 may cause another component, such as a servomotor of servomotors 114 to perform an action (e.g., a control operation) based on the input received by flight control system 108.

Wing articulation system 110 may include one or more devices configured to change a fold angle of the wings of aircraft 102. For example, wing articulation system 110 may include one or more motors (e.g., one or more electric motors), one or more motor drive controllers (e.g., one or more articulation motor drivers), one or more gearboxes, one or more encoders (e.g., one or more linear drive encoders), one or more sensors, one or more actuators, one or more wing coupling devices, one or more wing pivoting devices, and/or one or more linear drive assemblies. In some non-limiting embodiments, flight control system 108 may cause wing articulation system 110 to change a fold angle of the wings of aircraft 102 based on the airspeed of aircraft 102.

Thrust producing components 112 may include a plurality of devices configured to provide thrust to aircraft 102. For example, thrust producing components 112 may include a plurality of aircraft motors (e.g., one or more electric aircraft motors, one or more piston engines, one or more gas turbine engines, etc.). In some non-limiting embodiments, thrust producing components 112 may include a plurality of aircraft motors that include a propeller to provide thrust in a direction of flight (e.g., direction of travel) of aircraft 102. In some non-limiting embodiments, aircraft 102 may forego including wing articulation system 110, and aircraft 102 may be configured to change a fold angle of the wings of aircraft 102 using one or more of thrust producing components 112. For example, the wings of aircraft 102 may be transitioned without an articulation mechanism (e.g., wing articulation system 110). In such an example, the wings of aircraft 102 may be transitioned using only thrust from thrust producing components 112 to transition.

Servomotors 114 may include one or more devices, such as one or more servomotors, configured to allow for precise control of angular or linear position, velocity, and acceleration of a component of aircraft 102. For example, servomotors 114 may include an actuator (e.g., a rotary actuator or a linear actuator) and/or a motor coupled to a sensor for feedback and a control device (e.g., a controller) designed for use with servomotors 114. In some non-limiting embodiments, servomotors 114 may include one or more servomotors for control of components of aircraft 102 to control a direction of flight and/or orientation of aircraft 102. For example, servomotors 114 may include one or more servomotors to control a flight control surface (e.g., a flap, an aileron, an elevator, a rudder, a tab, a spoiler, etc.) of aircraft 102. In some non-limiting embodiments, servomotors 114 may include one or more tail servomotors (e.g., one or more tail rudder servomotors), one or more aileron servomotors, one or more elevator servomotors, a variable pitch servomotor for adjusting a pitch of propeller blades, one or more servomotors for flaps, and/or the like.

Radio communication device 116 may include one or more devices configured to allow aircraft 102 to communicate with another electronic device or entity, such as aircraft control system 104. For example, radio communication device 116 may include one or more radios, which may include one or more transceivers, one or more transmitters, one or more receivers, and/or the like. In some non-limiting embodiments, radio communication device 116 may include one or more devices that permit only one-way communication, such as one or more transmitters or one or more receivers. For example, radio communication device 116 may include a receiver without a transmitter. In such an example, aircraft 102 may use radio communication device 116 to receive information (e.g., control signals from aircraft control system 104, information associated with a flight path of aircraft 102, etc.) but aircraft 102 may not be able to transmit information.

Sensors 118 may include one or more devices configured to provide information regarding aircraft 102. For example, sensors 118 may include one or more force sensors associated with components on aircraft 102, one or more accelerometers, one or more gyroscopes, one or more location sensors (e.g., one or more global positioning system (GPS) sensors), one or more navigational sensors (e.g., one or more magnetic sensors that provide an indication of a northern direction), one or more altitude sensors, one or more airspeeds sensors, one or more electrical sensors (e.g., one or more power source (e.g., battery) sensors, one or more sensors associated with current from and/or voltage of a power source or other electrical component of aircraft 102), one or more component position sensors (e.g., one or more sensors associated with a flight control surface of aircraft 102, one or more sensors associated with a position of a wing of aircraft 102, one or more sensors associated with a fold angle of a wing of aircraft 102, etc.)

Referring now to FIG. 2, illustrated is a diagram of example components of device 200. Device 200 may correspond to one or more devices of aircraft 102. For example, device 200 may correspond to flight control system 108. In some non-limiting embodiments, aircraft 102 (e.g., flight control system 108 of aircraft 102) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor (e.g., a sensor of sensors 118) for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include data associated with a set of profiles, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
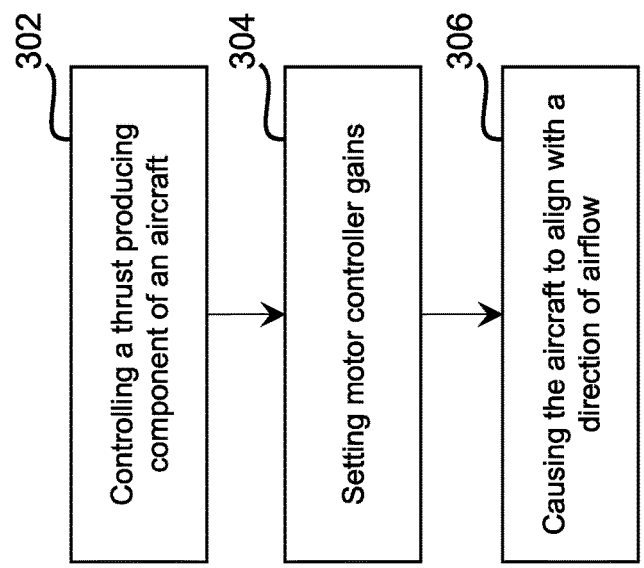
FIGS. 3-5 are flowcharts of non-limiting embodiments of processes for controlling an aircraft.

Referring now to FIG. 3, illustrated is a flowchart of a non-limiting aspect or embodiment of a process 300 for autonomously controlling a transition of an aircraft between a hovering configuration and a forward flight configuration. In some non-limiting embodiments or aspects, one or more of the functions described with respect to process 300 may be performed (e.g., completely, partially, etc.) by aircraft 102, for example, by flight control system 108 of aircraft 102. In some non-limiting embodiments or aspects, one or more of the steps of process 300 described below may be performed (e.g., completely, partially, and/or the like) by another device or a group of devices separate from and/or including flight control system 108, such as aircraft control system 104, wing articulation system 110, and/or servomotors 114.

As shown in FIG. 3, at step 302, process 300 may include controlling a thrust producing component of an aircraft. For example, flight control system 108 may control thrust producing components of aircraft 102 to cause aircraft 102 to rise vertically when the wings of aircraft 102 are in a first folded configuration (e.g., a multi-copter configuration). In such an example, a fuselage of aircraft 102 may be maintained to be substantially horizontal to earth when the wings of aircraft 102 are in a first folded configuration and aircraft 102 rises vertically. In some non-limiting embodiments, when the wings of aircraft 102 are in the first folded configuration, a leading edge of each wing is oriented in a vertical direction. Additionally, when the wings of aircraft 102 are in the first folded configuration, the wings may be at a maximum amount of articulation. For example, the wings may be in a configuration of maximum articulation based on an amount of articulation that may be provided by wing articulation system 110. In some non-limiting embodiments, a first thrust producing component of the plurality of thrust producing components of the aircraft may be attached to a first wing of the wings of aircraft 102 and a second thrust producing component of the plurality of thrust producing components of aircraft 102 may be attached to a second wing of the wings of aircraft 102. When the wings of the aircraft are in the first folded configuration, the first thrust producing component and the second thrust producing component may be oriented to produce thrust in a vertically upward direction. In this way, the first thrust producing component and the second thrust producing component may allow aircraft 102 to perform a vertical take-off operation (e.g., rise vertically from a position on the ground) and/or hover at a desired altitude. In some non-limiting embodiments, when the wings of aircraft 102 are in the first folded configuration, the size envelope of aircraft 102 may be between 10% and 75% smaller than when the wings of aircraft 102 are in an unfolded configuration. In some non-limiting embodiments, when the wings of aircraft 102 are in the first folded configuration, the size envelope of aircraft 102 may be at least 75% smaller than when the wings of aircraft 102 are in the unfolded configuration.

In some non-limiting embodiments, flight control system 108 may determine a configuration of the wings of aircraft 102. For example, flight control system 108 may determine whether the configuration of the wings of aircraft 102 corresponds to the first folded configuration based on a sensor of sensors 118 (e.g., a wing position sensor of sensors 118). In some non-limiting embodiments, flight control system 108 may determine a configuration of the wings of aircraft 102 based on a fold angle of the wings of aircraft 102. For example, flight control system 108 may determine the fold angle of the wings of aircraft 102 based on a sensor of sensors 118 (e.g., a fold angle sensor of sensors 118) and flight control system 108 may determine that the fold angle of the wings of aircraft 102 correspond to the first folded configuration.

In some non-limiting embodiments, flight control system 108 may determine a center of gravity of aircraft 102. For example, flight control system 108 may determine a center of gravity of aircraft 102 before providing power to the plurality of thrust producing components of aircraft 102 to cause aircraft 102 to rise vertically. In some non-limiting embodiments, flight control system 108 may determine and/or adjust an orientation of aircraft 102 based on the center of gravity of aircraft 102.

As shown in FIG. 3, at step 304, process 300 may include setting motor controller gains (e.g., motor control gains associated with wing articulation system 110, motor control gains associated with thrust producing component 112, motor control gains associated with servomotors 114, etc.). For example, flight control system 108 may set motor controller gains based on a configuration of the wings of the aircraft. In such an example, flight control system 108 may set motor controller gains based on the wings of the aircraft being in the first folded configuration. In some non-limiting embodiments, flight control system 108 may set motor controller gains by receiving a first input from a first sensor of sensors 118, causing a change in a component of aircraft 102 (e.g., a flight control surface of aircraft 102, thrust producing component 112 of aircraft 102, wing articulation system 110, etc.), receiving a second input from a second sensor of sensors 118, and determining an amount of change of an aspect (e.g., an orientation, an airspeed, an altitude, etc.) of aircraft 102 based on causing the change in the component of aircraft 102.

As shown in FIG. 3, at step 306, process 300 may include causing the aircraft to align with a direction of airflow. For example, flight control system 108 may cause aircraft 102 to align with a direction of airflow (e.g., to weathervane into a direction of the wind against aircraft 102). In some non-limiting embodiments, flight control system 108 may cause aircraft 102 to align with the direction of airflow when the wings of aircraft 102 are in the first folded configuration. In some non-limiting embodiments, flight control system 108 may cause aircraft 102 to align with the direction of airflow by adjusting a flight control surface of aircraft 102 and/or by controlling a thrust producing component of aircraft 102. In some non-limiting embodiments, flight control system 108 may cause aircraft 102 to align with the direction of airflow by allowing the airflow to cause aircraft 102 to change an orientation of aircraft 102, such that aircraft 102 is aligned with the direction of airflow. For example, flight control system 108 may cause aircraft 102 to align with the direction of airflow by allowing the airflow to cause a nose of aircraft 102 to be aligned with the direction of airflow. In some non-limiting embodiments, flight control system 108 may determine that aircraft 102 is aligned with the direction of airflow when the wings of aircraft 102 are in the first folded configuration and the aircraft is in flight.

In some non-limiting embodiments, flight control system 108 may determine that the aircraft has reached a target altitude, a target location, and/or a flight path. For example, flight control system 108 may determine that the aircraft has reached a target altitude based on an output from a sensor of sensors 118 (e.g., an altitude sensor of sensors 118). In some non-limiting embodiments, flight control system 108 may change a fold angle of the wings of aircraft 102 based on determining that aircraft 102 has reached the target altitude, a target location, and/or a flight path. For example, flight control system 108 may change the fold angle of the wings of aircraft 102 from the first folded configuration to a first fold angle based on determining that aircraft 102 has reached the target altitude. In some non-limiting embodiments, flight control system 108 may change the fold angle of the wings of aircraft 102 by controlling (e.g., transmitting a control signal to) wing articulation system 110, and wing articulation system 110 may articulate the wings of aircraft 102 from the first folded configuration to a first fold angle.

In some non-limiting embodiments, flight control system 108 may determine whether an orientation of aircraft 102 corresponds to a predetermined orientation (e.g. a predetermined orientation based on an airspeed of aircraft 102, a predetermined orientation based on an altitude of aircraft 102, a predetermined orientation based on a location of aircraft 102, etc.). For example, flight control system 108 may determine the orientation of aircraft 102 based on the pitch axis (e.g., the transverse axis), the yaw axis (e.g., the normal axis), and/or the roll axis (e.g., the longitudinal axis) associated with aircraft 102. Flight control system 108 may compare the orientation of aircraft 102 to the predetermined orientation of aircraft 102 and determine whether the orientation of aircraft 102 corresponds to the predetermined orientation of aircraft 102. If flight control system 108 determines that the orientation of aircraft 102 matches the predetermined orientation of aircraft 102, flight control system 108 may determine that the orientation of aircraft 102 corresponds to the predetermined orientation of aircraft 102. If flight control system 108 determines that the orientation of aircraft 102 does not match the predetermined orientation of aircraft 102, flight control system 108 may determine that the orientation of aircraft 102 does not correspond to the predetermined orientation of aircraft 102.

In some non-limiting embodiments, flight control system 108 may adjust a flight control surface of aircraft 102 based on determining that the orientation of the aircraft does not correspond to the predetermined orientation. Additionally or alternatively, flight control system 108 may control (e.g., provide power to) one or more thrust producing components of a plurality of thrust producing components of aircraft 102 to cause the orientation of aircraft 102 to change based on determining that the orientation of the aircraft does not correspond to the predetermined orientation.

In some non-limiting embodiments, the plurality of thrust producing components of aircraft 102 may include a plurality of aircraft motors, each of the aircraft motors may include a propeller. A pitch of the propeller blades of a propeller may be adjustable based on servomotors 114 (e.g., a servomotor of servomotors 114, where the servomotor is dedicated to adjusting a pitch of the propeller blades). In some non-limiting embodiments, flight control system 108 may control a servomotor (e.g., a servomotor of servomotors 114) that is dedicated to adjusting a pitch of propeller blades of one or more aircraft motors of a plurality of aircraft motors of aircraft 102 to cause the orientation of aircraft 102 to change. For example, flight control system 108 may control the servomotor to cause the orientation of aircraft 102 to change along a pitch axis, a roll axis, and/or a yaw axis, based on determining that the orientation of the aircraft does not correspond to the predetermined orientation. In some non-limiting embodiments, flight control system 108 may control a first servomotor that is dedicated to adjusting a pitch of propeller blades of a first aircraft motor of the plurality of aircraft motors and a second servomotor that is dedicated to adjusting a pitch of propeller blades of a second aircraft motor of the plurality of aircraft motors to cause the orientation of aircraft 102 to change. In some non-limiting embodiments, flight control system 108 may control a servomotor to cause the orientation of aircraft 102 to change along a pitch axis, a roll axis, and/or a yaw axis when the wings of aircraft 102 are in a first folded configuration or when the wings of aircraft 102 are in an unfolded configuration.

In some non-limiting embodiments, flight control system 108 may change a fold angle of the wings of aircraft 102. For example, flight control system 108 may change the fold angle of the wings of aircraft 102 by controlling (e.g., transmitting a control signal to) wing articulation system 110 and/or thrust producing components 112. In some non-limiting embodiments, wing articulation system 110 may cause the fold angle of the wings of aircraft 102 to change by operating a drive (e.g., a linear drive) that changes the fold angle of the wings based on flight control system 108 controlling wing articulation system 110. Additionally or alternatively, thrust producing components 112 may cause the fold angle of the wings of aircraft 102 to change by operating a thrust producing component based on flight control system 108 controlling thrust producing components 112.

In some non-limiting embodiments, flight control system 108 may change a fold angle of the wings of aircraft 102 from the first folded configuration. For example, flight control system 108 may change a fold angle of the wings of aircraft 102 from the first folded configuration to a first fold angle based on an airspeed of aircraft 102. In some non-limiting embodiments, flight control system 108 may change the fold angle of the wings of aircraft 102 based on a control signal received from aircraft control system 104. For example, flight control system 108 may receive the control signal from aircraft control system 104, and flight control system 108 may change the fold angle of the wings of aircraft 102 based on the control signal (e.g., based on data associated with a specified fold angle included in the control signal). In some non-limiting embodiments, flight control system 108 may change a fold angle of the wings of aircraft 102 and maintain an orientation of aircraft 102. For example, flight control system 108 may change the fold angle of the wings of aircraft 102 and maintain the orientation of aircraft 102, such that the fuselage of aircraft 102 is substantially horizontal to earth while the fold angle of the wings of aircraft 102 is changing.

Figure 4:
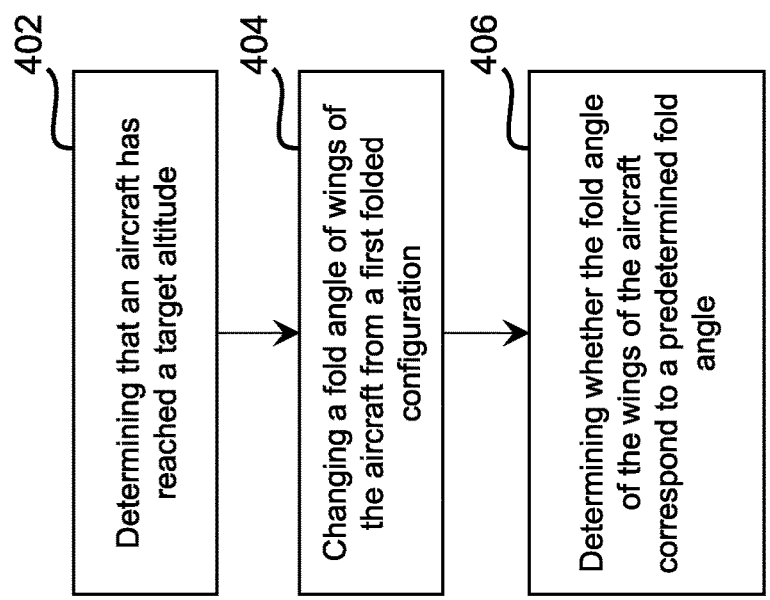

Referring now to FIG. 4, illustrated is a flowchart of a non-limiting embodiment or aspect of a process 400 for autonomously controlling transition of an aircraft between a hovering configuration and a forward flight configuration. In some non-limiting embodiments or aspects, one or more of the functions described with respect to process 400 may be performed (e.g., completely, partially, etc.) by flight control system 108. In some non-limiting embodiments or aspects, one or more of the steps of process 400, described below, may be performed (e.g., completely, partially, and/or the like) by another device or a group of devices separate from and/or including flight control system 108, such as aircraft control system 104, wing articulation system 110, and/or servomotors 114. In some non-limiting embodiments, process 400 may be performed following process 300.

As shown in FIG. 4, at step 402, process 400 may include determining that an aircraft has reached a target altitude. For example, flight control system 108 may determine that aircraft 102 has reached a target altitude based on controlling a plurality of thrust producing components of aircraft 102 to cause the aircraft to rise vertically to the target altitude when wings of aircraft 102 are in a first folded configuration.

In some non-limiting embodiments, flight control system 108 may determine whether an orientation of aircraft 102 corresponds to a predetermined orientation after determining that aircraft 102 has reached the target altitude. In some non-limiting embodiments, flight control system 108 may adjust a flight control surface of aircraft 102 based on determining that the orientation of aircraft 102 does not correspond to the predetermined orientation.

As shown in FIG. 4, at step 404, process 400 may include changing a fold angle of wings of the aircraft from a first folded configuration. For example, flight control system 108 may change (e.g., transition) a fold angle of the wings of aircraft 102 from the first folded configuration based on determining that aircraft 102 has reached a target altitude. In some non-limiting embodiments, flight control system 108 may change the fold angle of the wings of aircraft 102 from the first folded configuration to a first fold angle based on an airspeed of aircraft 102. In some non-limiting embodiments, flight control system 108 may set motor controller gains based on the first fold angle of the wings of aircraft 102. For example, flight control system 108 may set motor controller gains when the wings of aircraft 102 are at the first fold angle.

Figure 6:
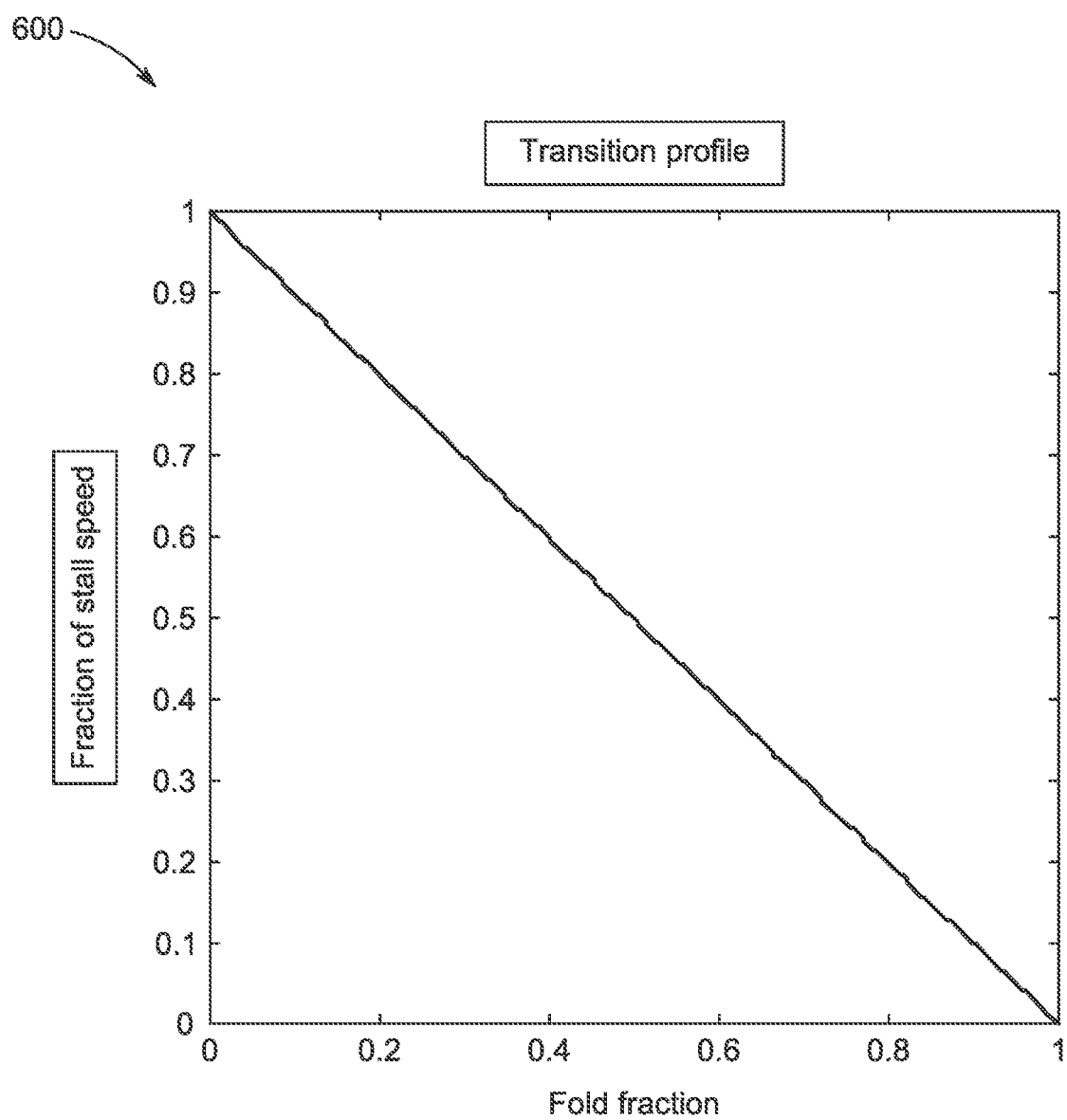
FIGS. 6-8 are non-dimensional graphs showing wing transition profiles based on a fraction of stall speed as a function of fold fraction.
Figure 7:
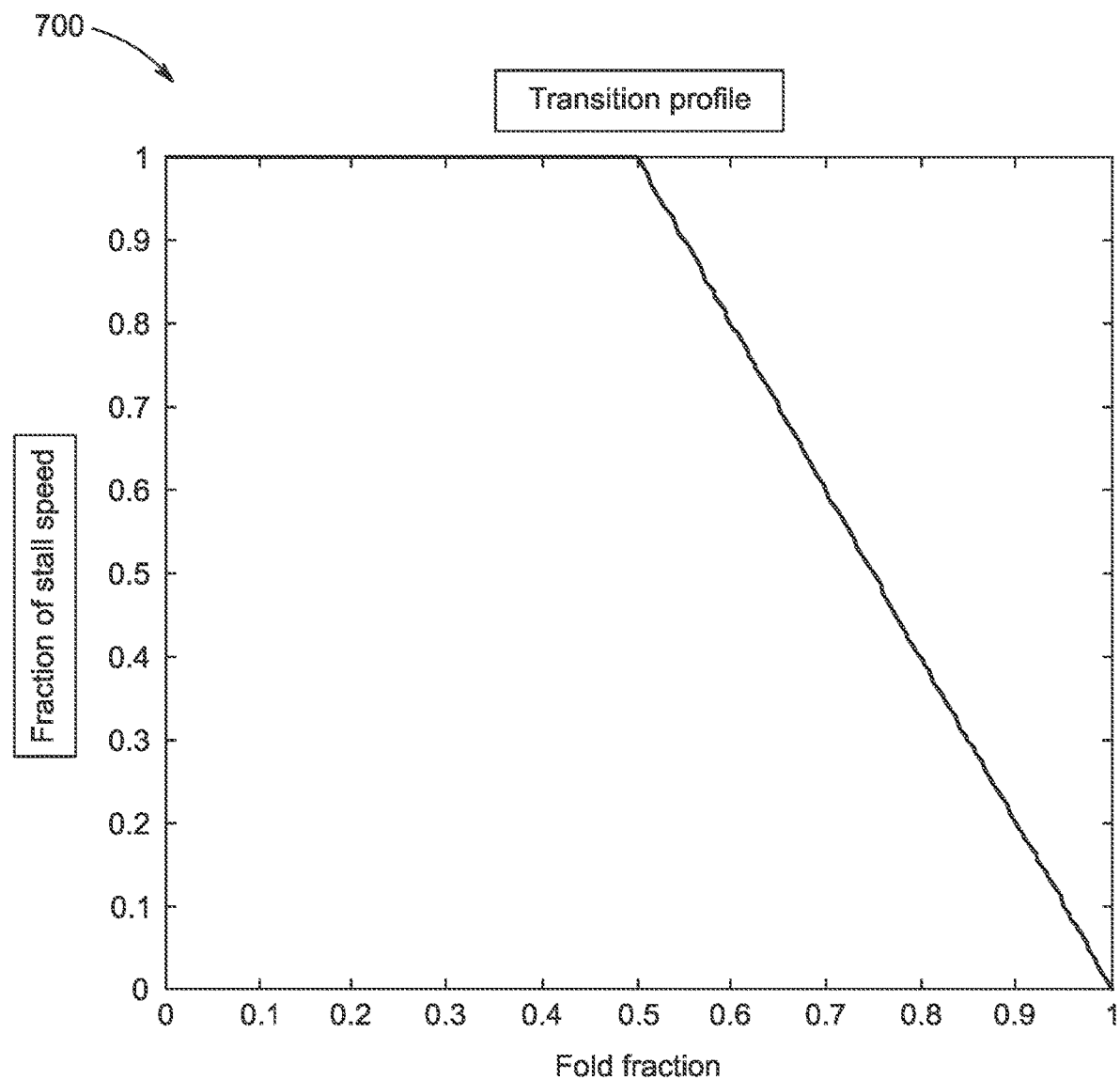
Figure 8:
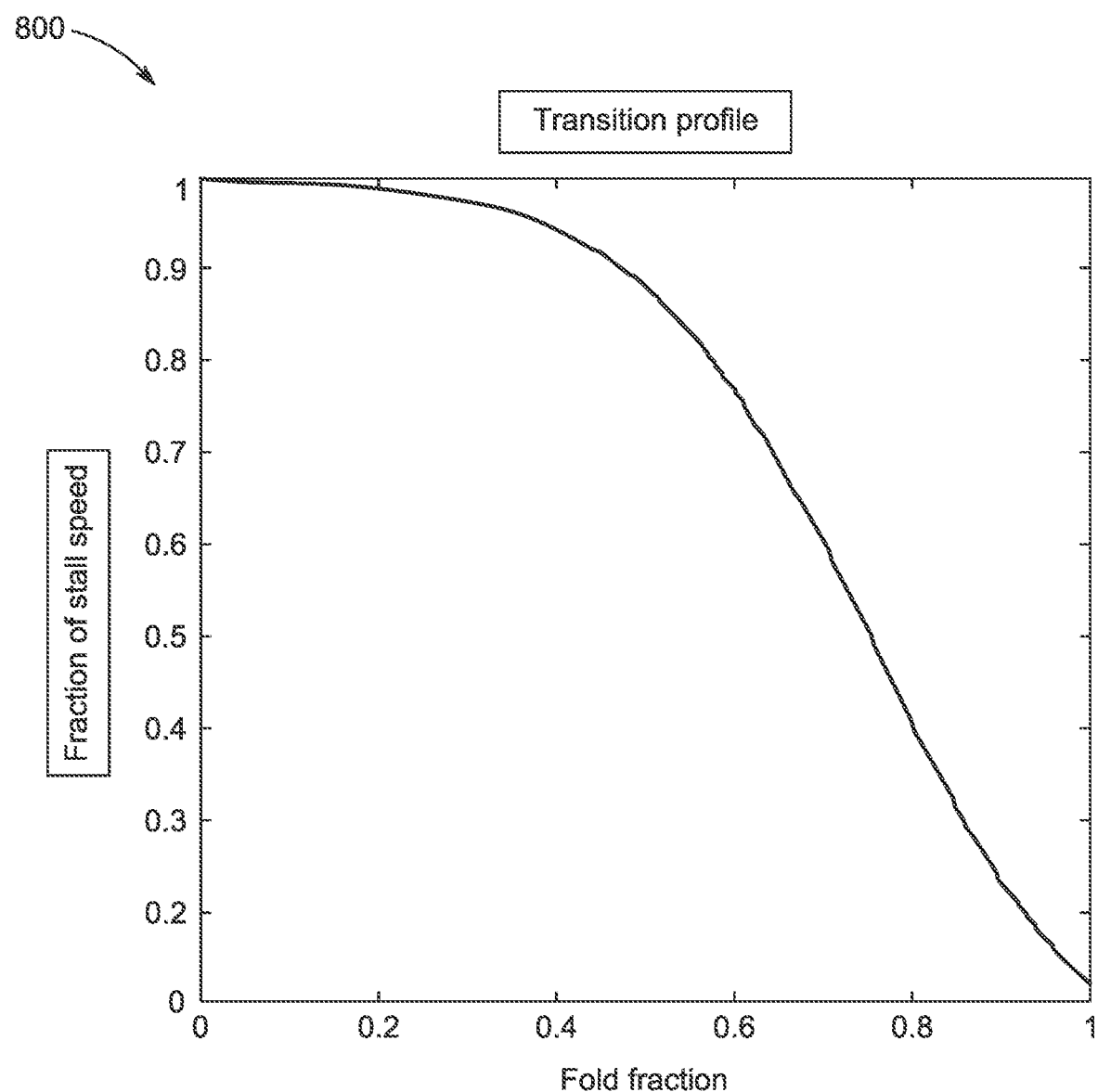

In some non-limiting embodiments, flight control system 108 may change the fold angle of the wings of aircraft 102 based on the airspeed of the aircraft. For example, flight control system 108 may change the fold angle of the wings of aircraft 102 according to a function (e.g., a transition profile) that is based on the airspeed of the aircraft. With referenced to FIGS. 6-8, flight control system 108 may change the fold angle of the wings of aircraft 102 according to function 600, 700, or 800, which are based on the airspeed of the aircraft that is shown as a fraction of stall speed of aircraft 102. As shown in FIGS. 6-8, a fold fraction of "0" indicates when the wings of aircraft 102 are in the unfolded configuration, and a fold fraction of "1" indicates when the wings of aircraft 102 are in the first folded configuration. In addition, flight control system 108 may change the fold angle of the wings of aircraft 102 based on a predetermined airspeed of aircraft 102, where the predetermined airspeed may be the stall speed of aircraft 102.

In some non-limiting embodiments, flight control system 108 may change the fold angle of the wings of aircraft 102 from the first folded configuration to a first fold angle based on a first airspeed of the aircraft, and flight control system 108 may change the fold angle of the wings of aircraft 102 from the first fold angle to an unfolded configuration (e.g., a forward flight configuration) based on a second airspeed of the aircraft. In some non-limiting embodiments, the first airspeed and the second airspeed may be different. For example, the second airspeed may be greater than the first airspeed.

In some non-limiting embodiments, flight control system 108 may change the fold angle of the wings of aircraft 102 at a transition speed. For example, flight control system 108 may change the fold angle of the wings of aircraft 102 from the first folded configuration at a first transition speed based on an airspeed of aircraft 102. In some non-limiting embodiments, the transition speed may be based on a speed at which wing articulation system 110 may change a fold angle of the wings. In some non-limiting embodiments, flight control system 108 may change the fold angle of the wings of aircraft 102 from a first fold angle (e.g., a fold angle associated with a second folded configuration) to an unfolded configuration at a maximum transition speed. For example, flight control system 108 may change the fold angle of the wings of aircraft 102 from the first fold angle to the unfolded configuration at a maximum transition speed based on the airspeed of aircraft 102 being equal to a stall speed of aircraft 102. In some non-limiting embodiments, flight control system 108 may adjust a flight control surface of aircraft 102 based on determining that an orientation of aircraft 102 does not correspond to a predetermined orientation at the same time when changing the fold angle of the wings of aircraft 102 from the first fold angle to the unfolded configuration.

In some non-limiting embodiments, flight control system 108 may adjust one or more flight control surface of aircraft 102 based on a configuration of the wings of aircraft 102. For example, flight control system 108 may adjust the one or more flight control surfaces (e.g., one or more flaps) of aircraft 102 before the wings of aircraft 102 change from the first folded configuration to the second folded configuration.

As shown in FIG. 4, at step 406, process 400 may include determining whether the fold angle of the wings of the aircraft correspond to a predetermined fold angle. For example, flight control system 108 may determine whether the fold angle of the wings of aircraft 102 correspond to a predetermined fold angle. In some non-limiting embodiments, flight control system 108 may compare the fold angle of the wings of aircraft 102 to the predetermined fold angle and determine whether the fold angle of the wings of aircraft 102 corresponds to the predetermined fold angle. If flight control system 108 determines that the fold angle of the wings of aircraft 102 matches the predetermined fold angle, flight control system 108 may determine that the fold angle of the wings of aircraft 102 corresponds to the predetermined fold angle. If flight control system 108 determines that the fold angle of the wings of aircraft 102 does not match the predetermined fold angle, flight control system 108 may determine that the fold angle of the wings of aircraft 102 does not correspond to the predetermined fold angle.

In some non-limiting embodiments, flight control system 108 may adjust a flight control surface of aircraft 102 based on the fold angle of the wings of aircraft 102. For example, flight control system 108 may adjust a flight control surface of aircraft 102 based on determining that the fold angle of the wings of aircraft 102 correspond to the predetermined fold angle.

In some non-limiting embodiments, flight control system 108 may determine whether the fold angle of the wings of aircraft 102 correspond to a predetermined configuration. For example, flight control system 108 may determine the fold angle of the wings of aircraft 102 and compare the fold angle of the wings to a fold angle associated with the predetermined configuration. If flight control system 108 determines that the fold angle of the wings of aircraft 102 matches the fold angle associated with the predetermined configuration, flight control system 108 may determine that the fold angle of the wings of aircraft 102 corresponds to the predetermined configuration. If flight control system 108 determines that the fold angle of the wings of aircraft 102 does not match the fold angle associated with the predetermined configuration, flight control system 108 may determine that the fold angle of the wings of aircraft 102 does not correspond to the predetermined configuration. In some non-limiting embodiments, the predetermined configuration may include a second folded configuration, which may include a configuration of the wings of aircraft 102 having a fold angle that is halfway between a first folded configuration and an unfolded configuration. In some non-limiting embodiments, the predetermined configuration may include an unfolded configuration.

In some non-limiting embodiments, when the wings of aircraft 102 are in the unfolded configuration, a leading edge of each wing is oriented in a horizontal direction. Additionally or alternatively, when the wings of aircraft 102 are in the unfolded configuration, the wings may be at a point of no (e.g., zero) articulation. For example, the wings may be in a configuration of no articulation based on an amount of articulation that may be provided by wing articulation system 110. When the wings of the aircraft are in the unfolded configuration, a first thrust producing component and a second thrust producing component may be oriented to produce thrust in a horizontal direction (e.g., forward flight direction). In this way, the thrust producing components may allow aircraft 102 to achieve forward flight in a desired direction.

In some non-limiting embodiments, flight control system 108 may determine a flight path of aircraft 102, and flight control system 108 may control a plurality of thrust producing components of aircraft 102 to cause aircraft 102 to fly according to the flight path. For example, flight control system 108 may determine the flight path of aircraft 102 and control the plurality of thrust producing components of aircraft 102 based on determining that the fold angle of the wings of the aircraft correspond to a fold angle associated with the unfolded configuration of the wings of aircraft 102. In some non-limiting embodiments, flight control system 108 may control the plurality of thrust producing components of aircraft 102 to cause aircraft 102 to fly according to the flight path based on a center of gravity of aircraft 102.

In some non-limiting embodiments, flight control system 108 may control a servomotor that is dedicated to adjusting a pitch of propeller blades of one or more aircraft motors of a plurality of aircraft motors of aircraft 102 during flight of aircraft 102. For example, flight control system 108 may control the servomotor to cause the pitch of propeller blades of one or more aircraft motors of a plurality of aircraft motors of aircraft 102 to change (e.g., to feather the propeller blades) to allow aircraft 102 to glide during flight of aircraft 102 along a flight path.

In some non-limiting embodiments, flight control system 108 may control one or more thrust producing components of a plurality of thrust producing components of aircraft 102 based on energy consumption. For example, flight control system 108 may provide power to one or more thrust producing components that use electricity and may forgo providing power to one or more thrust producing components that use internal combustion to reduce energy consumption when aircraft 102 is in flight.

Figure 5:
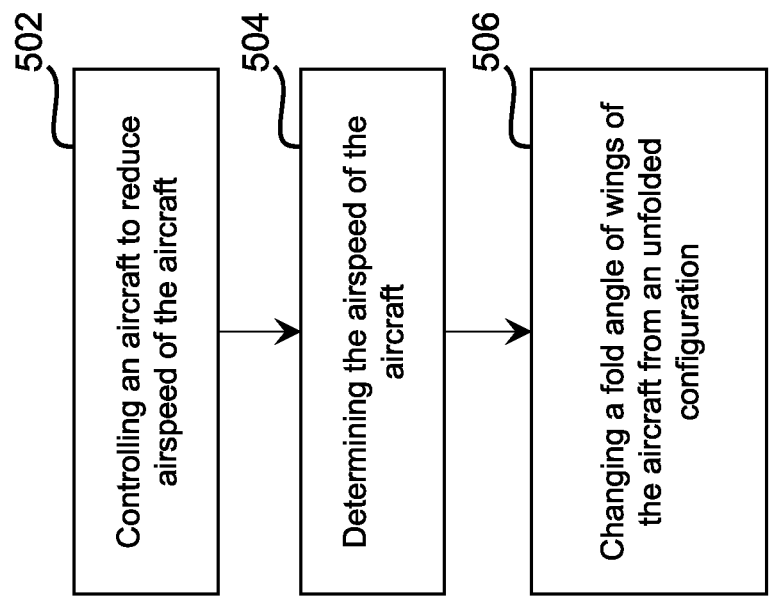

Referring now to FIG. 5, illustrated is a flowchart of a non-limiting embodiment or aspect of a process 500 for autonomously controlling a transition of an aircraft between a forward flight configuration and a hovering configuration. In some non-limiting embodiments, one or more of the steps described with respect to process 500 may be performed (e.g., completely, partially, etc.) by flight control system 108. In some non-limiting embodiments, one or more of the steps of process 500 described below may be performed (e.g., completely, partially, and/or the like) by another device or a group of devices separate from and/or including flight control system 108, such as aircraft control system 104, wing articulation system 110, and/or servomotors 114. In some non-limiting embodiments, process 500 may be performed following performance of process 400.

As shown in FIG. 5, at step 502, process 500 may include controlling an aircraft to reduce airspeed of the aircraft. For example, flight control system 108 may control aircraft 102 to cause aircraft 102 to reduce the airspeed of aircraft 102 when the wings of aircraft 102 are in an unfolded configuration. In some non-limiting embodiments, flight control system 108 may control aircraft 102 to cause aircraft 102 to reduce the airspeed of aircraft 102 by controlling one or more thrust producing components of aircraft 102 and/or a flight control surface to reduce the airspeed of aircraft 102 when the wings of aircraft 102 are in an unfolded configuration.

As shown in FIG. 5, at step 504, process 500 may include determining the airspeed of the aircraft. For example, flight control system 108 may determine the airspeed of aircraft 102 based on a sensor of sensors 118 (e.g., an airspeed sensor of sensors 118).

In some non-limiting embodiments, flight control system 108 may compare the airspeed of aircraft 102 to a threshold value and determine whether the airspeed of aircraft 102 is greater or less than the threshold value. In some non-limiting embodiments, flight control system 108 may control aircraft 102 to decelerate the aircraft based on determining that the airspeed of the aircraft is greater than the threshold value. In some non-limiting embodiments, flight control system 108 may control aircraft 102 to accelerate the aircraft based on determining that the airspeed of aircraft 102 is less than the threshold value.

In some non-limiting embodiments, flight control system 108 may control one or more thrust producing components of aircraft 102 based on the airspeed of aircraft 102. Additionally or alternatively, flight control system 108 may adjusting a flight control surface of aircraft 102 based on the airspeed of aircraft 102.

As shown in FIG. 5, at step 506, process 500 may include changing a fold angle of wings of the aircraft from an unfolded configuration. For example, flight control system 108 may change a fold angle of the wings of aircraft 102 from the unfolded configuration based on the airspeed of aircraft 102. In some non-limiting embodiments, flight control system 108 may change the fold angle of the wings of aircraft 102 from the unfolded configuration to a first folded configuration based on the airspeed of aircraft 102. For example, flight control system 108 may change the fold angle of the wings of aircraft 102 from the unfolded configuration to the first folded configuration at a transition speed that is based on the airspeed of aircraft 102. In some non-limiting embodiments, flight control system 108 may change the fold angle of the wings of aircraft 102 from the unfolded configuration to the first folded configuration at the transition speed according to a function (e.g., function 600, 700, or 800) that is based on the airspeed of aircraft 102. In some non-limiting embodiments, flight control system 108 may change the fold angle of the wings of aircraft 102 from the unfolded configuration to the first folded configuration based on determining that the airspeed of aircraft 102 satisfies a threshold value. In some non-limiting embodiments, the threshold value may be equal to value above a stall speed of aircraft 102.

It is noted that steps described with regard to FIG. 3, FIG. 4, and FIG. 5 are not exclusive to a respective figure. Steps may be interchanged between FIG. 3, FIG. 4, and FIG. 5 and are described above with regard to separate figures for illustrative purposes. In addition, steps described with regard to FIG. 3, FIG. 4, and FIG. 5 may be achieved manually, semi-autonomously, or autonomously where appropriate based on the description of the given action performed, except as where expressly noted otherwise.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As described above, the present disclosure includes various embodiments of aircraft 102 capable of efficient forward flight, as well as slow speed maneuvering and hovering to achieve vertical take-off and landing (VTOL). In some non-limiting embodiments, an airframe of aircraft 102, described herein, may include a fuselage, such as a single elongate fuselage that can extend substantially horizontally during forward flight. In some non-limiting embodiments, the fuselage may include opposed wings extending therefrom, and each wing can include an inner fixed portion and an outer folding portion (e.g., an outer tilting portion). The outer folding portion of each wing can be configured to fold (e.g., pivot, tilt, etc.) relative to the inner fixed portion about an axis that is oblique to a longitudinal axis and/or lateral axis of aircraft 102, such as a longitudinal axis of the elongate fuselage or a laterally extending axis perpendicular to the longitudinal axis of the elongate fuselage. In some non-limiting embodiments, the area of each inner fixed portion can be relatively small to allow vertically-directed airflow without significant drag force during hovering flight. In some non-limiting embodiments, the outer folding portion of each wing can have a larger area than the area of each inner fixed portion. In some non-limiting embodiments, the outer folding portion of each wing can be configured to be folded, such that a leading edge of the outer folding portion faces vertically upward when aircraft 102 is in a hovering configuration (e.g., when the wings of aircraft 102 are in the first folded configuration) and such that the leading edge of the outer folding portion faces horizontally forward during forward flight (e.g., when the wings of aircraft 102 are in the unfolded configuration). The outer folding portion of each wing can carry one or more thrust producing components. In some non-limiting embodiments, the one or more thrust producing components may be moved between a vertically positioned orientation when aircraft 102 is hovering and a horizontal positioned orientation when aircraft 102 is in forward flight. The outer folding portion of each wing may represent a significant portion of an area encompassed by the wing of aircraft 102 and/or weight of aircraft 102 and, when in a forward flight configuration, the outer folding portion can merge with the inner fixed portion to create an uninterrupted surface of the wing.

Figure 9:
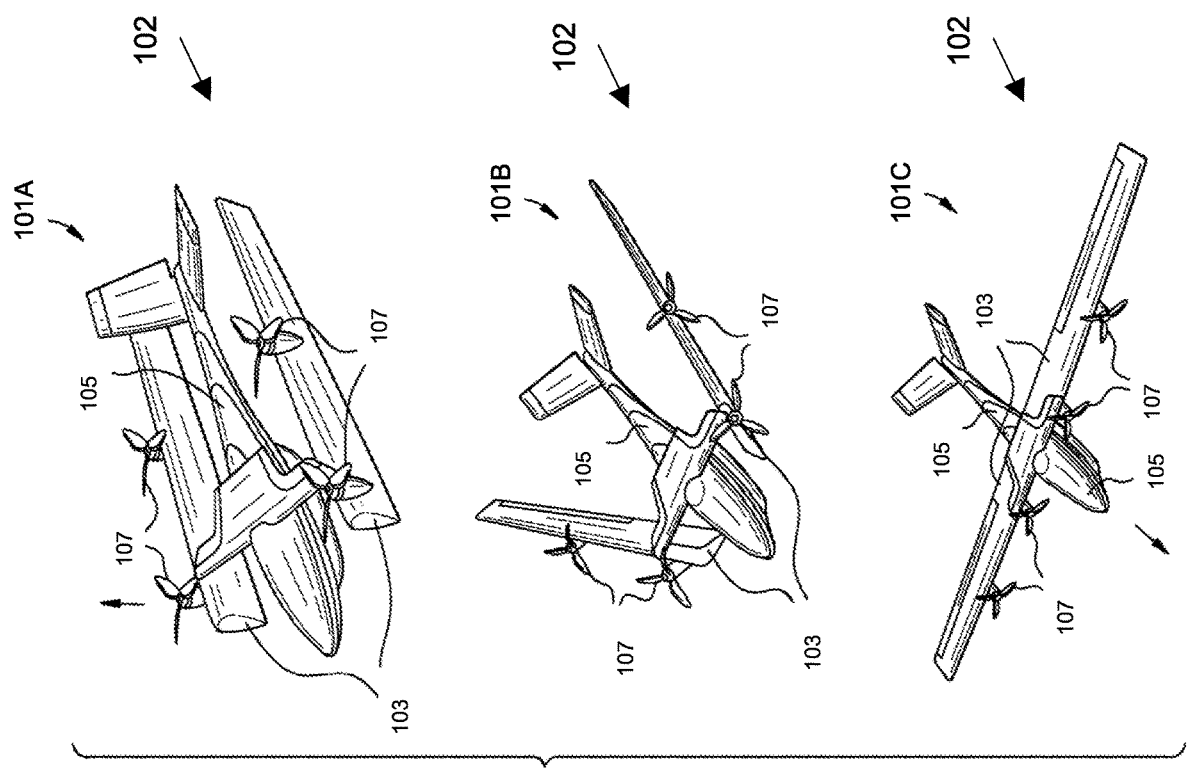
FIG. 9 provides diagrams of a non-limiting embodiment of different wing configurations of wings of an aircraft capable of vertical take-off and landing.

Referring now to FIG. 9, FIG. 9 provides diagrams of wing configurations of aircraft 102. As shown in FIG. 9, in wing configuration 101A, which is described herein as a first folded configuration, wings 103 of aircraft 102 are configured for hovering, slow speed maneuvering, and VTOL-capable flight operation. In wing configuration 101A, wings 103 have been tilted relative to fuselage 105 such that they extend parallel to a length of fuselage 105 and such that a leading edge of wings 103 faces vertically upward or toward an upper surface of the airframe of aircraft 102. In wing configuration 101A, thrust producing components 107 coupled to wings 103 are also oriented vertically and allow stable hovering flight and relatively slow speed maneuvering in any direction.

As further shown in FIG. 9, a fold angle of wings 103 can be changed from wing configuration 101A to wing configuration 101B, described herein as a second folded configuration, when transitioning to wing configuration 101C. As further shown in FIG. 9, the design of wings 103 and thrust producing components 107 may allow a seamless, aerodynamically benign transition from wing configuration 101A to a forward flight configuration, described herein as an unfolded configuration, shown as wing configuration 101C. In wing configuration 101C, wings 103 may be fully deployed with a leading edge of wings 103 facing horizontally forward. In wing configuration 101C, wings 103 may generate lift to support the weight of the airframe of aircraft 102, and an extended flight range of aircraft 102 may be achieved through fast and aerodynamically efficient flight. In some non-limiting embodiments, the transition between wing configurations 101A-101C can proceed from wing configuration 101A to wing configuration 101C or vice versa. In some non-limiting embodiments, the transition between wing configurations 101A-101C can be paused (e.g., paused for a time interval, such as a predetermined time interval, paused indefinitely, etc.) at any intermediate configuration between wing configuration 101A and the forward flight configuration 101C to enable varying degrees of maneuverability and flight speed of aircraft 102.

In some embodiments, an aircraft may comprise four propeller motors (two on each wing) in which the two inboard propellers/motors are designed for constant speed (variable pitch) during forward flight (e.g., cruise flight, cruising, etc.) when the wings are unfolded. The two inboard propellers motors may remain active throughout the entire flight, which the two outboard propellers/motors are fixed-pitch propellers each with a folding mechanism in the hub to facilitate folding of the propellers during forward flight to reduce their drag profile when the motors are shut down and the propellers are stowed. That is, each propeller may fold about a folding mechanism so that the propellers are in-line with the length or profile of the respective wing in a manner to reduce drag. One advantage to this configuration is that the overall efficiency can be dramatically improved by only running two (of four) motors at a high RPM, while the other two motors are shut off and the propellers are folded. In this configuration, a higher electrical efficiency outweighs the lower overall efficiency of alternatively running all four motors at a reduced RPM during forward flight. This can also reduce or minimize the overall system complexity and system weight.

In some non-limiting embodiments, all of the propellers on an aircraft may be configured to fold about a folding mechanism at the respective hub of the motor/propeller, and therefore, each propeller may be in-line with a profile of the respective wing to reduce drag. Propellers may be most efficient when they operate near max L/D, which is just before they stall, and, motors are most efficient when they are at 50-70% of their max power.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method of autonomously controlling an aircraft comprising:
    determining, by at least one processor, a first center of gravity of the aircraft based on wings of the aircraft being in a first folded configuration before providing power to a plurality of thrust producing components of the aircraft to cause the aircraft to rise vertically;
    controlling, by the at least one processor, the plurality of thrust producing components of the aircraft to cause the aircraft to rise vertically based on the wings of the aircraft being in the first folded configuration, wherein, when the wings of the aircraft are in the first folded configuration, a leading edge of each wing is oriented in a vertical direction;
    setting, by the at least one processor, motor controller gains based on the wings of the aircraft being in the first folded configuration;
    causing, by the at least one processor, the aircraft to align with a direction of airflow based on the wings of the aircraft being in the first folded configuration;
    determining, by the at least one processor, that the aircraft is aligned with the direction of airflow based on the wings of the aircraft being in the first folded configuration and the aircraft is in flight;
    determining, by the at least one processor, that the aircraft has reached a target altitude;
    determining, by the at least one processor, that an orientation of the aircraft based on a pitch axis, a yaw axis, and/or a roll axis corresponds to a predetermined orientation of the aircraft based on the pitch axis, the yaw axis, and/or the roll axis;
    changing, by the at least one processor, the wings of the aircraft from the first folded configuration to an unfolded configuration based on an airspeed of the aircraft; and
    autonomously controlling, by the at least one processor, the plurality of thrust producing components of the aircraft, wherein autonomously controlling the plurality of thrust producing components of the aircraft comprises:
        determining a second center of gravity of the aircraft based on the wings of the aircraft being in the unfolded configuration; and
        causing the aircraft to fly according to a flight path based on the second center of gravity of the aircraft based on the wings of the aircraft being in the unfolded configuration.

2. The computer-implemented method of claim 1, wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

3. The computer-implemented method of claim 1, further comprising:
    changing a fold angle of the wings of the aircraft from the first folded configuration based on the airspeed of the aircraft.

4. The computer-implemented method of claim 1, further comprising:
    adjusting a flight control surface of the aircraft based on determining that the orientation of the aircraft does not correspond to the predetermined orientation.

5. The computer-implemented method of claim 1, further comprising:
    providing power to one thrust producing component of the plurality of thrust producing components of the aircraft to cause the orientation of the aircraft to change based on determining that the orientation of the aircraft does not correspond to the predetermined orientation.

6. A system for autonomously controlling comprising:
    at least one processor programmed or configured to:

determine a first center of gravity of the aircraft based on wings of the aircraft being in a first folded configuration before providing power to a plurality of thrust producing components of the aircraft to cause the aircraft to rise vertically;

control the plurality of thrust producing components of the aircraft to cause the aircraft to rise vertically based on wings of the aircraft being in a first folded configuration, wherein, when the wings of the aircraft are in the first folded configuration, a leading edge of each wing is oriented in a vertical direction;

set motor controller gains based on the wings of the aircraft being in the first folded configuration;

cause the aircraft to align with a direction of airflow based on wings of the aircraft being in the first folded configuration;

determine that the aircraft is aligned with the direction of airflow based on wings of the aircraft being in a first folded configuration and the aircraft is in flight;

determine that the aircraft has reached a target altitude;

determine that an orientation of the aircraft based on a pitch axis, a yaw axis, and/or a roll axis corresponds to a predetermined orientation of the aircraft based on the pitch axis, the yaw axis, and/or the roll axis;

change the wings of the aircraft from the first folded configuration to an unfolded configuration based on an airspeed of the aircraft; and autonomously control the plurality of thrust producing components of the aircraft, wherein, when autonomously controlling the plurality of thrust producing components of the aircraft, the at least one processor is programmed or configured to:

determine a second center of gravity of the aircraft based on the wings of the aircraft being in the unfolded configuration; and cause the aircraft to fly according to a flight path based on the second center of gravity of the aircraft based on the wings of the aircraft being in the unfolded configuration.

7. The system of claim 6, wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

8. The system of claim 6, wherein the at least one processor is further programmed or configured to:

change a fold angle of the wings of the aircraft from the first folded configuration based on the airspeed of the aircraft.

9. The system of claim 6, wherein the at least one processor is further programmed or configured to:

adjust a flight control surface of the aircraft based on determining that the orientation of the aircraft does not correspond to the predetermined orientation.

10. The system of claim 6, wherein the at least one processor is further programmed or configured to:

provide power to one thrust producing component of the plurality of thrust producing components of the aircraft to cause the orientation of the aircraft to change based on determining that the orientation of the aircraft does not correspond to the predetermined orientation.

11. A computer program product for autonomously controlling a transition of an aircraft between a hovering configuration and a forward flight configuration, comprising at least one non-transitory computer readable medium including one or more instructions that, when executed by at least one processor, cause the at least one processor to:

determine a first center of gravity of the aircraft based on wings of the aircraft being in a first folded configuration before providing power to a plurality of thrust producing components of the aircraft to cause the aircraft to rise vertically;

control the plurality of thrust producing components of the aircraft to cause the aircraft to rise vertically based on the wings of the aircraft being in a first folded configuration, wherein, when the wings of the aircraft are in the first folded configuration, a leading edge of each wing is oriented in a vertical direction;

set motor controller gains based on the wings of the aircraft being in the first folded configuration;

cause the aircraft to align with a direction of airflow based on the wings of the aircraft being in the first folded configuration;

determine that the aircraft is aligned with the direction of airflow based on the wings of the aircraft being in the first folded configuration and the aircraft is in flight;

determine that the aircraft has reached a target altitude;

determine that an orientation of the aircraft based on a pitch axis, a yaw axis, and/or a roll axis corresponds to a predetermined orientation of the aircraft based on the pitch axis, the yaw axis, and/or the roll axis;

change the wings of the aircraft from the first folded configuration to an unfolded configuration based on an airspeed of the aircraft; and autonomously control the plurality of thrust producing components of the aircraft, wherein, the one or more instructions that cause the at least one processor to autonomously control the plurality of thrust producing components of the aircraft, cause the at least one processor to:

determine a second center of gravity of the aircraft based on the wings of the aircraft being in the unfolded configuration; and cause the aircraft to fly according to a flight path based on the second center of gravity of the aircraft based on the wings of the aircraft being in the unfolded configuration.

12. The computer program product of claim 11, wherein a first thrust producing component of the plurality of thrust producing components of the aircraft is attached to a first wing of the wings of the aircraft and a second thrust producing component of the plurality of thrust producing components of the aircraft is attached to a second wing of the wings of the aircraft, and wherein when the wings of the aircraft are in the first folded orientation, the first thrust producing component and the second thrust producing component are oriented to produce thrust in a vertically upward direction.

13. The computer program product of claim 11, wherein the one or more instructions further cause the at least one processor to:

change a fold angle of the wings of the aircraft from the first folded configuration based on the airspeed of the aircraft.

14. The computer program product of claim 11, wherein the one or more instructions further cause the at least one processor to:

adjust a flight control surface of the aircraft based on determining that the orientation of the aircraft does not correspond to the predetermined orientation.

15. The computer program product of claim 11, wherein the one or more instructions further cause the at least one processor to:
provide power to one thrust producing component of the plurality of thrust producing components of the aircraft to cause the orientation of the aircraft to change based on determining that the orientation of the aircraft does not correspond to the predetermined orientation.

\* \* \* \* \*